(12) United States Patent
Stanczak et al.

(10) Patent No.: US 9,073,488 B1
(45) Date of Patent: Jul. 7, 2015

(54) VEHICLE BODY STRUCTURE

(71) Applicant: Nissan North America, Inc., Franklin, TN (US)

(72) Inventors: Matthew A. Stanczak, Troy, MI (US); Hidetake Matsuoka, Kanagawa (JP)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/291,277

(22) Filed: May 30, 2014

(51) Int. Cl.
*B60R 5/04* (2006.01)
*B60N 2/36* (2006.01)

(52) U.S. Cl.
CPC . *B60R 5/045* (2013.01); *B60N 2/36* (2013.01); *B60N 2002/363* (2013.01)

(58) Field of Classification Search
CPC ........ B60R 5/044; B60R 5/045; B60R 5/047; B60R 5/048; B60R 5/042; B60R 5/04
USPC .................. 296/24.43, 24.44, 37.16
See application file for complete search history.

(56) References Cited

U.S. PATENT DOCUMENTS

| | | | | |
|---|---|---|---|---|
| 4,536,025 A * | 8/1985 | Yamawaki et al. | ........ | 296/37.16 |
| 6,113,172 A * | 9/2000 | Chaloult et al. | ........... | 296/26.08 |
| 6,502,886 B1 * | 1/2003 | Bleau et al. | .................. | 296/37.3 |
| 6,644,709 B2 * | 11/2003 | Inagaki et al. | ............. | 296/37.16 |
| 6,773,046 B2 * | 8/2004 | Nakamitsu et al. | ........ | 296/37.16 |
| 7,438,338 B1 * | 10/2008 | Schumacher et al. | ....... | 296/37.6 |
| 7,481,477 B2 * | 1/2009 | Yang | ........................... | 296/37.16 |
| 7,748,775 B2 * | 7/2010 | Mercurio | ................. | 296/193.07 |
| 8,125,146 B2 * | 2/2012 | Park | .............................. | 313/512 |
| 8,172,295 B2 | 5/2012 | Fischer et al. | | |
| 8,534,736 B1 * | 9/2013 | Whalen | ....................... | 296/37.16 |
| 8,814,245 B1 * | 8/2014 | Welch et al. | ............... | 296/37.16 |
| 2007/0013201 A1 * | 1/2007 | Wagner et al. | ............. | 296/24.43 |
| 2009/0033119 A1 * | 2/2009 | Suzuki | ........................ | 296/37.14 |
| 2013/0009419 A1 * | 1/2013 | Torres et al. | ................ | 296/24.45 |
| 2013/0147226 A1 | 6/2013 | Cao et al. | | |
| 2013/0181472 A1 * | 7/2013 | Nakajima et al. | ............ | 296/37.1 |
| 2013/0193708 A1 | 8/2013 | Lucas | | |
| 2014/0015271 A1 * | 1/2014 | Demma | ..................... | 296/24.44 |
| 2014/0117695 A1 * | 5/2014 | Murru | ........................ | 296/24.44 |
| 2015/0054299 A1 * | 2/2015 | Yoshizawa et al. | ........ | 296/37.16 |

FOREIGN PATENT DOCUMENTS

| | | |
|---|---|---|
| EP | 1619077 A1 | 1/2006 |
| EP | 2033842 A2 | 3/2009 |

(Continued)

*Primary Examiner* — Gregory Blankenship
(74) *Attorney, Agent, or Firm* — Global IP Counselors, LLP

(57) ABSTRACT

A vehicle body structure includes a shelf and a removable member. The shelf is removably positioned in a shelf retention location between a first side wall structure and a second side wall structure within a vehicle cargo area. The shelf includes an upper surface having a first fastening structure and a lower surface having a second fastening structure. The removable member has a bar section and a fastener structure fixed to the bar section. The fastener structure is removably attachable to the first fastening structure or the second fastening structure such that with the fastener structure attached to the first fastening structure the bar section is positioned in a cargo movement restricting orientation along the upper surface of the shelf and with the fastener structure attached to the second fastening structure the removable member is in a stowed orientation adjacent to the lower surface of the shelf.

20 Claims, 20 Drawing Sheets

(56) References Cited

FOREIGN PATENT DOCUMENTS

| | | | |
|---|---|---|---|
| EP | 2095998 | A1 | 9/2009 |
| EP | 2105352 | A1 | 9/2009 |
| JP | 2001-328488 | A | 11/2001 |
| JP | 2003-291732 | A | 10/2003 |
| JP | 2006-062618 | A | 3/2006 |
| JP | 2009-161034 | A | 7/2009 |
| JP | 2013-111992 | A | 6/2013 |

* cited by examiner

VEHICLE BODY STRUCTURE

BACKGROUND

1. Field of the Invention

The present invention generally relates to a vehicle body structure that defines a vehicle cargo area. More specifically, the present invention relates to vehicle body structure that includes a shelf and a removable member that can be attached to an upper side of the shelf in a cargo movement restricting orientation or can be attached to a lower side of the shelf in a stowed orientation.

2. Background Information

A new passenger vehicle typically includes a cargo area that can receive any of a variety of types of cargo. Most cargo areas typically include a deck surface and an optional cover in order to conceal any cargo related objects placed on the deck surface.

SUMMARY

One object of the invention is to provide a vehicle cargo area with a shelf that includes a cargo retaining member that can be attached to an upper surface of the shelf for limiting movement of cargo and then removed, and attached to an underside of the shelf in a stowed orientation when not needed.

The vehicle body structure includes a vehicle floor, a first side wall structure, a second side wall structure, a shelf and a removable member. The first side wall structure extends upward from a first side of the vehicle floor and has a first shelf supporting surface. The second side wall structure extends upward from a second side of the vehicle floor opposite the first side wall structure and has a second shelf supporting surface. The vehicle floor, the first side wall structure and the second side wall structure at least partially define a vehicle cargo area. The first and second shelf supporting surfaces are aligned with one another defining a shelf retention location within the vehicle cargo area. The shelf is removably positioned in the shelf retention location extending from the first side wall structure to the second side wall structure. The shelf includes an upper surface having a first fastening structure and a lower surface having a second fastening structure. The removable member has a bar section and a fastener structure fixedly attached to the bar section. The fastener structure is removably attachable to the first fastening structure and the second fastening structure such that with the fastener structure of the removable member attached to the first fastening structure the bar section is positioned in a cargo movement restricting orientation along the upper surface of the shelf. Further, with the fastener structure attached to the second fastening structure the removable member is in a stowed orientation adjacent to the lower surface of the shelf.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
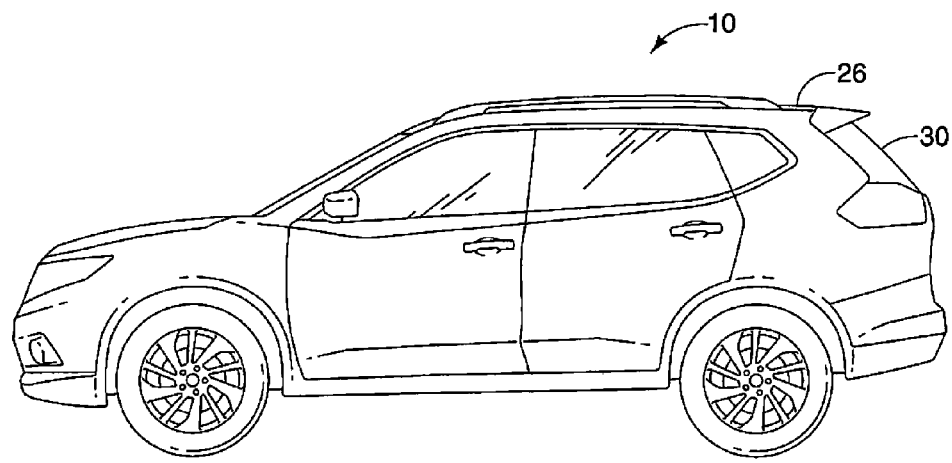
FIG. 1 is a side view of a vehicle that includes a body structure that defines a cargo area with a shelving arrangement in accordance with a first embodiment.
Figure 2:
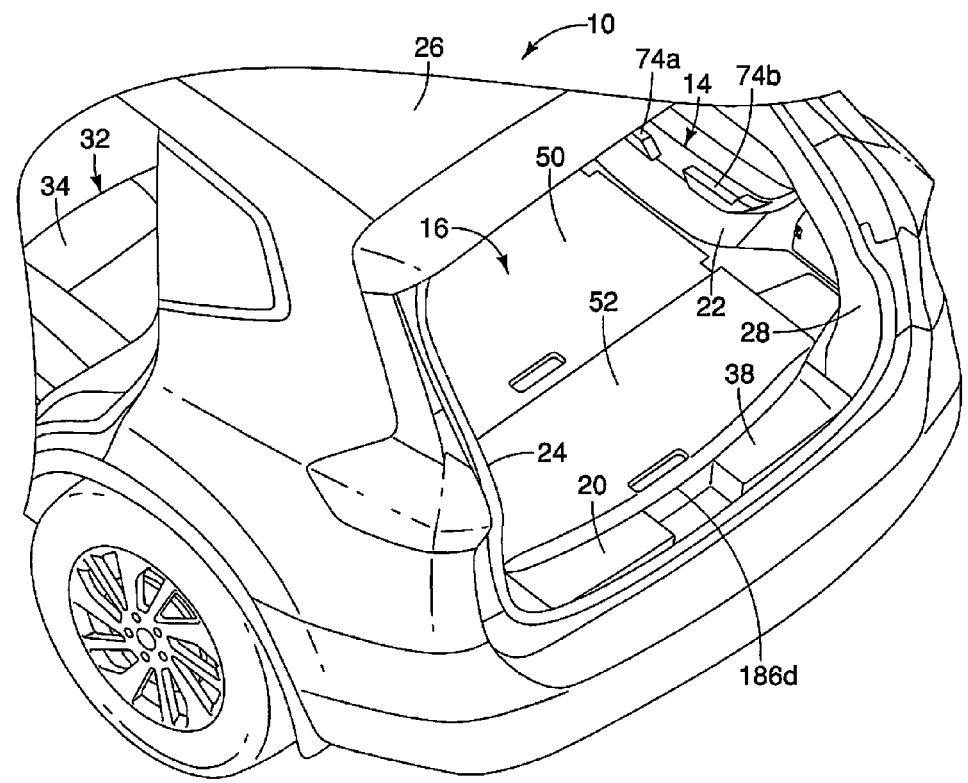
FIG. 2 is a rear perspective view of the vehicle with a rear door removed showing a portion of the cargo area along with a forward shelf and an aft shelf in accordance with the first embodiment.
Figure 3:
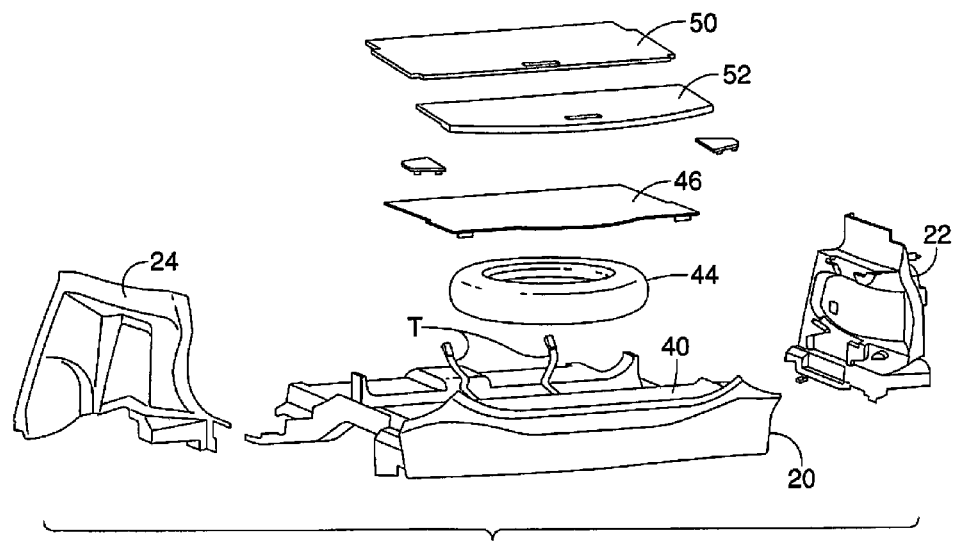
FIG. 3 is an exploded view of portions of the body structure that define the cargo area, including a floor structure, a first side wall structure, a second side wall structure, a deck panel, the forward shelf and the aft shelf in accordance with the first embodiment.

Referring initially to FIG. 1, a vehicle 10 is illustrated in accordance with a first embodiment. As shown in FIG. 2, the vehicle 10 includes a vehicle body structure 12 that defines a cargo area 14 with a shelving arrangement 16 that is described in greater detail below. The vehicle body structure 12 has, among other elements, a floor structure 20, a first side wall structure 22, a second side wall structure 24 and a roof structure 26.

The floor structure 20, the first side wall structure 22, the second side wall structure 24 and the roof structure 26 define a rear hatch opening 28 that is covered by a rear door 30 that moves between an open position (not shown) and a closed position (FIG. 1) covering the rear hatch opening 28. In FIG. 2, the rear door 30 has been removed to reveal the cargo area 14.

Figure 4:
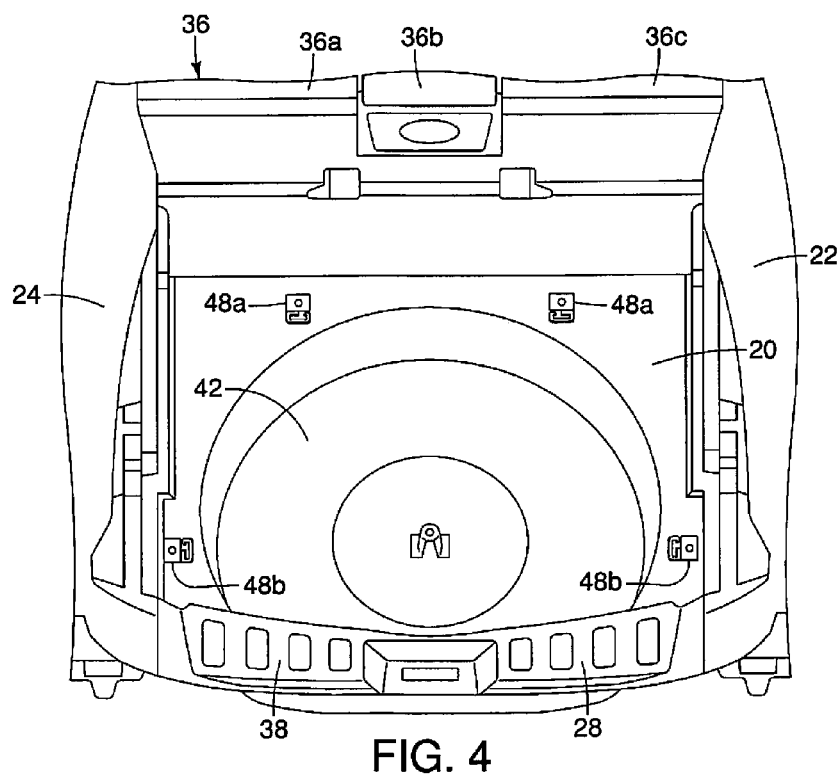
FIG. 4 a rear perspective view showing the cargo area with the deck panel, the forward shelf and the aft shelf removed to reveal details of the floor structure in accordance with the first embodiment.
Figure 5:
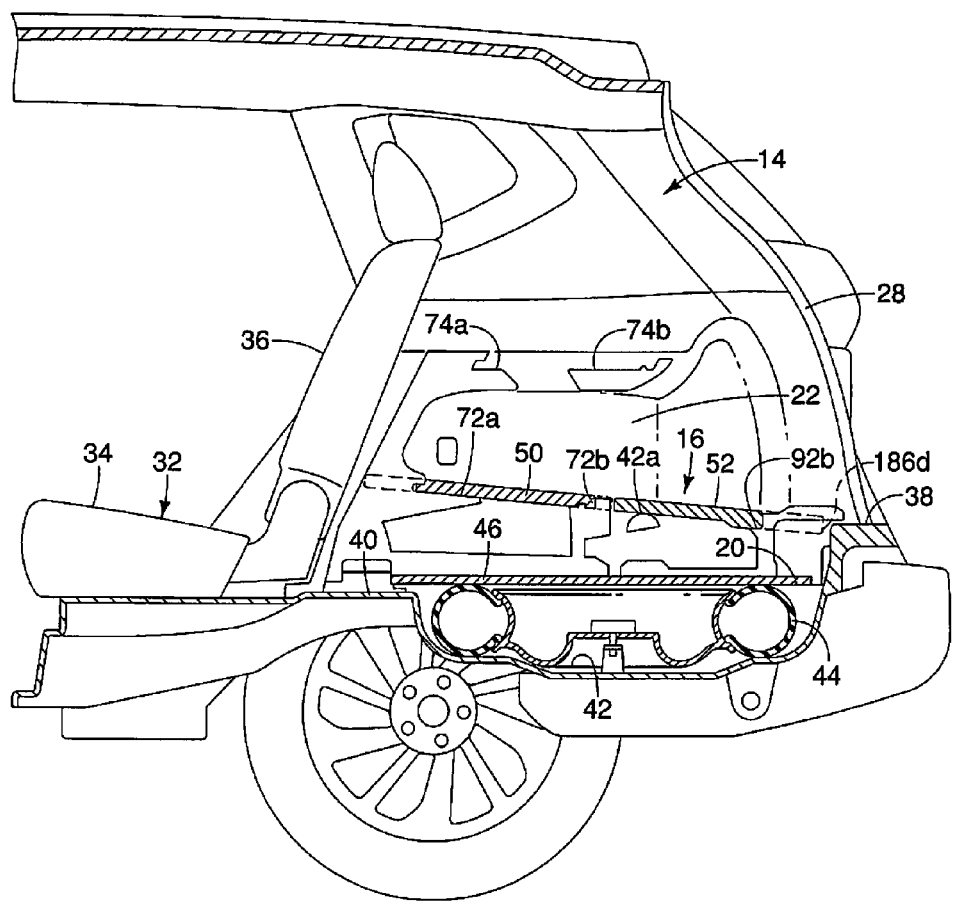
FIG. 5 a cross-sectional side view of the vehicle showing the floor structure, the deck panel, the forward shelf and the aft shelf and details of the first side wall structure including shelf supporting surfaces and shelf guiding surfaces in accordance with the first embodiment.
Figure 44:
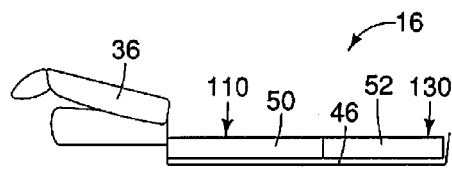
FIG. 44-53 are schematic side views of the cargo area with the seatback of the rear seat in the folded orientation, with the forward and aft shelves in various combinations of positions in accordance with the first embodiment.

A rear seat assembly 32 is attached to the floor structure 20 in a conventional manner, as shown in FIGS. 2, 4 and 5. For example, the rear seat assembly 32 can be attached to the floor structure 20 with removable fasteners (not shown). The rear seat assembly 32 includes a seat cushion 34 (FIGS. 2 and 5) and seatback 36 (FIGS. 4 and 5), which include seatback sections 36a, 36b and 36c (FIG. 4). The seatback 36 (and individual seatback sections 36a, 36b and 36c) are movable between an upright orientation shown in FIGS. 5 and 34, and a folded orientation shown in FIG. 44.

Figure 19:
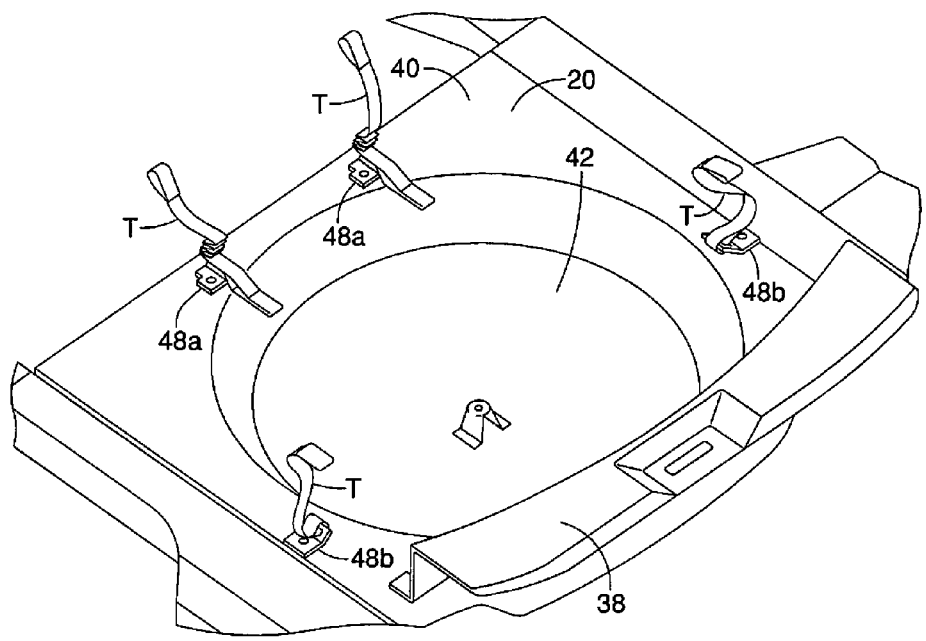
FIG. 19 is a perspective view of the floor structure showing the tether clips and tethers in accordance with the first embodiment.

As shown in FIGS. 4 and 19, the floor structure 20 also includes sill section 38 that partially defines the rear hatch opening 28.

The cargo area 14 is located rearward of the seatback 36 of the rear seat assembly 32 with the seatback 36 in the upright orientation. When the seatback 36 is moved to the folded orientation, the cargo area 14 is extended such that cargo can be placed on the upwardly facing surface of the seatback 36 (in the folded orientation). The cargo area 14 is further defined within the vehicle 10 between the first and second side wall structures 22 and 24, above the floor structure 20.

As shown in FIGS. 3-5 and 18-19, the floor structure 20 has an upper surface 40 that includes a concaved area defining a concealed cargo space 42 sufficient to receive a spare tire 44. The concealed cargo space 42, as shown in the drawings, is a circular shaped concaved area that is shaped to receive the spare tire 44, but can alternatively have a differing shape in order to store additional vehicle related elements. As shown in FIG. 5, the concealed cargo space 42 is concealed below the shelving arrangement 16. Specifically, a deck panel 46 is dimensioned and shaped to overlay and cover most of the upper surface 40 of the floor structure 20. Further, the deck panel 46 extends along the bottom of the cargo area 14.

Figure 6:
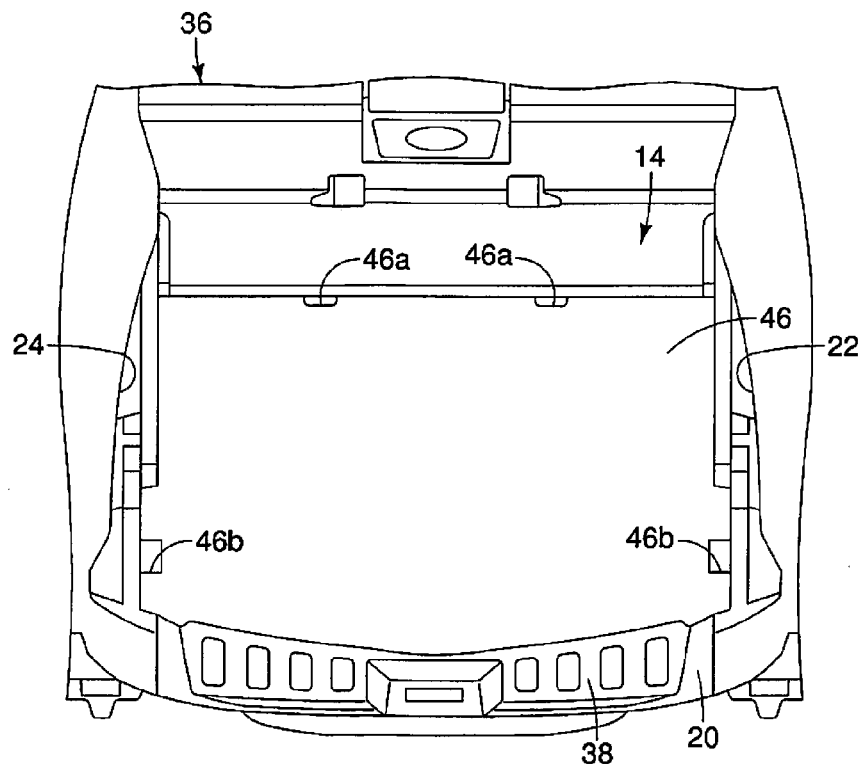
FIG. 6 another rear perspective view similar to FIG. 4 showing the cargo area with the deck panel installed covering portions of the floor structure in accordance with the first embodiment.
Figure 20:
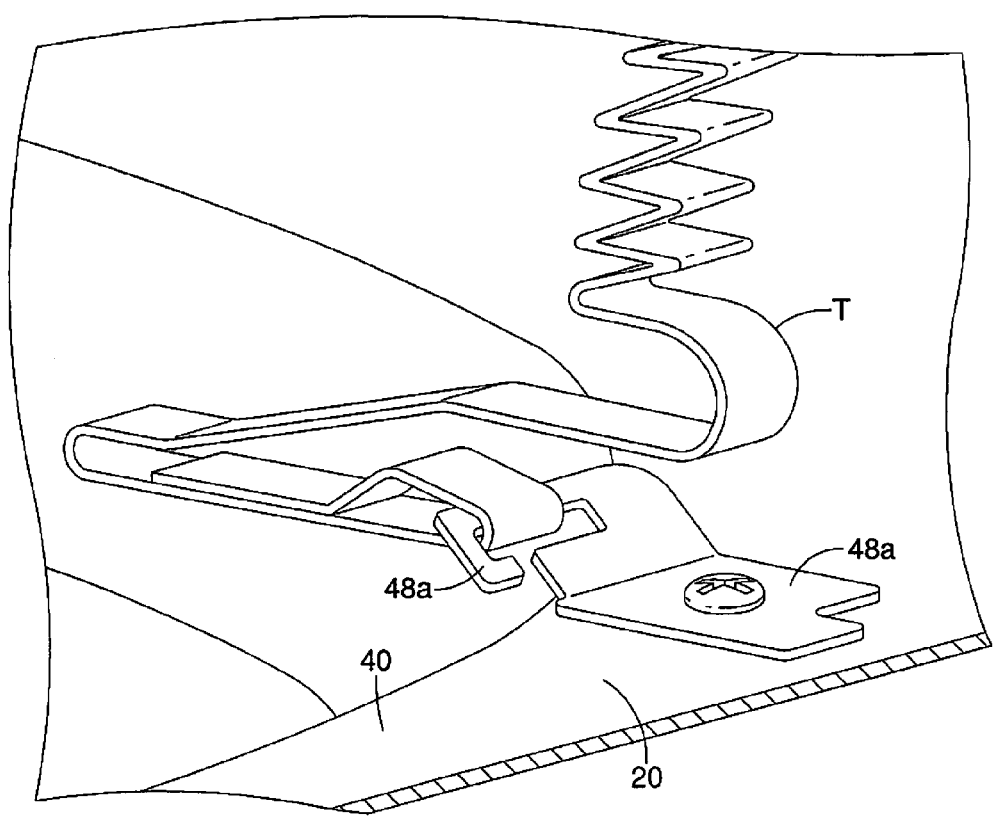
FIG. 20 is a close-up perspective view of a portion of the floor structure showing one of the tether clips and one of the tethers in accordance with the first embodiment.

As shown in FIG. 4, the floor structure 20 also includes four tether clips 48 that are rigidly fixed in position by, for example, mechanical fasteners. The tether clips 48 and tethers T are described in greater detail below with reference to FIGS. 18-20. The tether clips 48 are hidden beneath the deck panel 46. However, the deck panel 46 includes tether recesses 46a and 46b, as shown in FIG. 6. The tethers T extend through the tether recesses 46a and 46b.

A description of the shelving arrangement 16 is now provided with specific reference to FIGS. 8-33. The shelving arrangement 16 is basically defined by the first side wall structure 22, the second side wall structure 24, a forward shelf 50 and an aft shelf 52. As is described in greater detail below, the first and second side wall structures 22 are configured to support the forward shelf 50 and the aft shelf 52 in a variety of positions. In the positions shown in FIG. 7, the forward shelf 50 and the aft shelf 52 completely cover the floor structure 20 and the deck panel 46. With the forward shelf 50 and the aft shelf 52 in other positions (described below), portions of the deck panel 46 can be exposed, as described below.

Figure 8:
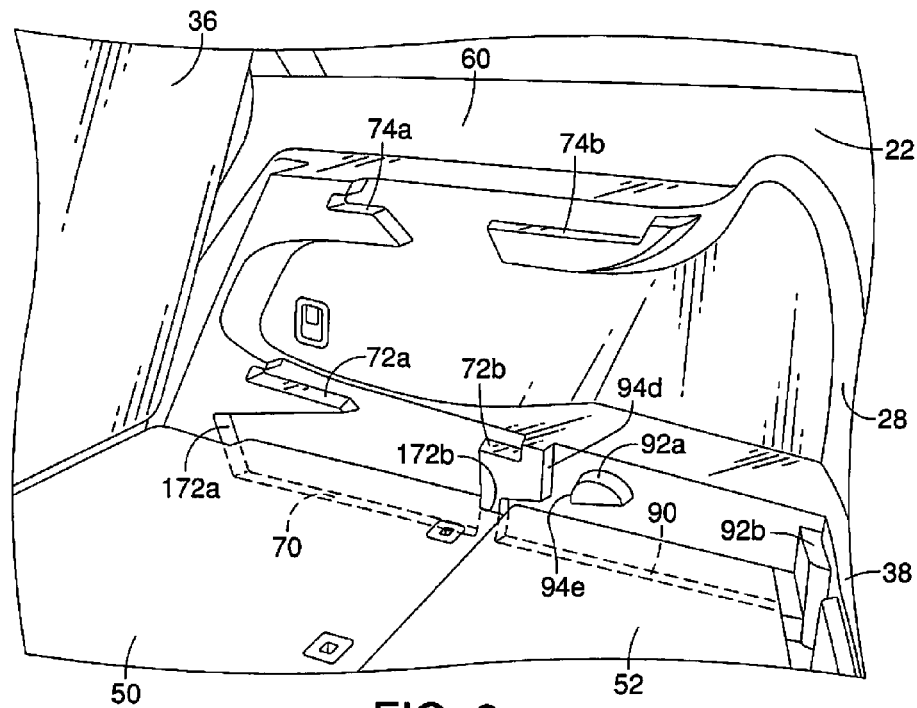
FIG. 8 is a perspective view of the cargo area showing the floor structure and the first side wall structure including most of the shelf supporting surfaces and the shelf guiding surfaces in accordance with the first embodiment.
Figure 10:
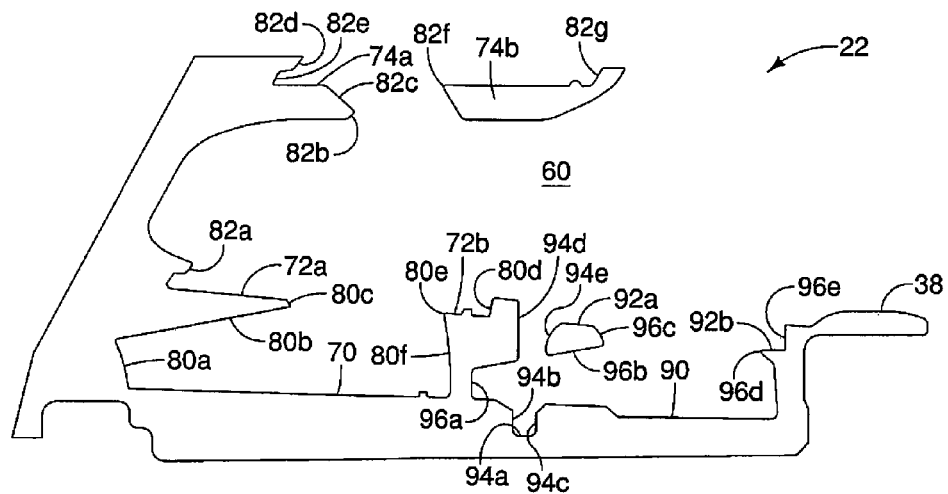
FIG. 10 is a schematic side view of the first side wall structure showing only the shelf supporting surfaces and the shelf guiding surfaces in accordance with the first embodiment.

The first side wall structure 22 can include a plurality of elements, such as an outer side panel and an inner side panel. However, for purposes of understanding the shelving arrangement 16, description of the first side wall structure 22 is directed to an interior surface 60, as shown in FIGS. 8 and 10. The interior surface 60 of the first side wall structure 22 extends upward from a first side of the floor structure 20 within the cargo area 14. The interior surface 60 includes a plurality of protrusions and adjacent recesses that together define a plurality of surfaces that are further described below.

Figure 9:
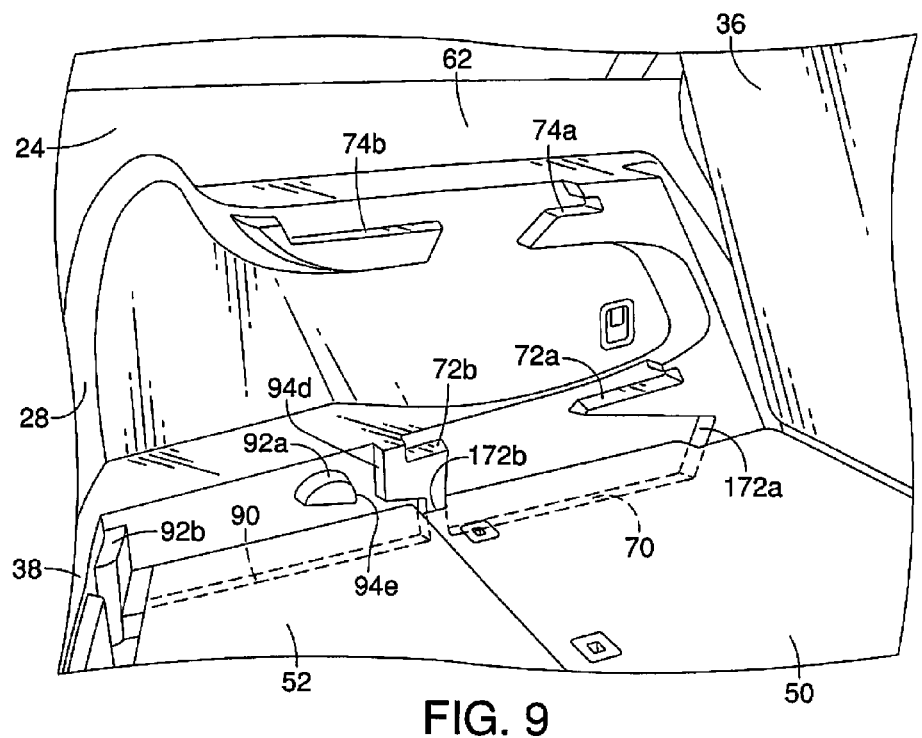
FIG. 9 is another perspective view of the cargo area showing the floor structure and the second side wall structure including most of the shelf supporting surfaces and the shelf guiding surfaces in accordance with the first embodiment.

The second side wall structure 24 can similarly include a plurality of elements, such as an outer side panel and an inner side panel. However, for purposes of understanding the shelving arrangement 16, description of the second side wall structure 24 is directed to an interior surface 62, as shown in FIG. 9. The interior surface 62 of the second side wall structure 24 extends upward from a second side of the floor structure 20 (opposite the first side) within the cargo area 14. The interior surface 62 also includes a plurality of protrusions and adjacent recesses that together define a plurality of surfaces that are further described below.

The interior surface 60 of the first side wall structure 22 and the interior surface 62 of the second side wall structure 24 face one another and are symmetrical with respect to one another. Put another way, the interior surface 60 and the interior surface 62 are identical to one another except that they are mirror images of one another. More specifically, each and every contour and shape of the interior surface 60 of the first side wall structure 22 is present on the interior surface 62 of the second side wall structure 22, except that the interior surface 62 is a mirror image of the interior surface 60. Therefore, the description below of the interior surface 60 of the first side wall structure 20 equally applies to the interior surface 62 of the second side wall structure 24. Consequently, for the sake of brevity, only the features of the interior surface 60 are described below, but apply equally to the interior surface 62.

More specifically, the various projections, recesses, surfaces and surface contours of the interior surface 60 described below are also provided on the interior surface 62 of the second side wall structure 24. The surfaces and surface contours of the interior surface 60 are aligned with the corresponding surfaces and surface contours of the interior surface 62. Consequently, the interior surface 62 of the second side wall structure 24 is provided with reference numerals identical to those of the interior surface 60 of the first side wall structure 24 since they function together.

As shown in FIGS. 8 and 10, the interior surface 60 (and the interior surface 62 in FIG. 9) is provided with a plurality of first or forward shelf supporting surfaces 70, 72a, 72b, 74a and 74b, a plurality of forward shelf guiding surfaces 80a, 80b, 80c, 80d, 80e, 80f, 82a, 82b, 82c, 82d, 82e, 82f and 82g, a plurality of second or aft shelf supporting surfaces 90, 92a, 92b, 94a, 94b, 94c, 94d and 94e, and a plurality of second or aft shelf guiding surfaces 96a, 96b, 96c, 96d, 98a, 98b, 98c, 98d and 98e. The forward shelf supporting surfaces 70, 72a, 72b, 74a and 74b all extend in a generally horizontal direction and face upward and are dimensioned to support the forward shelf 50, as described further below. The aft shelf supporting surfaces 90, 92a, 92b and 94a all include at least a surface portion that extends in a generally horizontal direction and face upward. The aft shelf supporting surfaces 90, 92a, 92b and 94a are dimensioned to support the aft shelf 52, as described further below. The aft shelf supporting surfaces 94b, 94c, 94d and 94e all include at least a surface portion that extends in a generally vertical direction.

Figure 11:
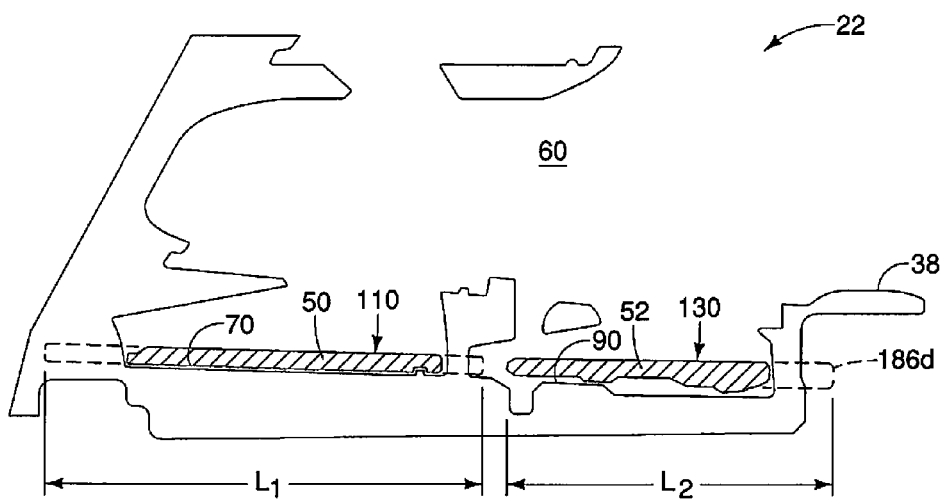
FIG. 11 is another schematic side view of the first side wall structure showing the shelf supporting surfaces and the shelf guiding surfaces with the forward shelf supported by one of the shelf supporting surfaces in a lower retention location and the aft shelf supported by one of the shelf supporting surfaces in a lower aft retention location in accordance with the first embodiment.

The forward shelf supporting surface 70 of each of the interior surface 60 of the first side wall structure 22 and the interior surface 62 of the second side wall structure 24 together define a lower retention location 110, as shown in FIG. 11 for supporting the forward shelf 50. The forward shelf supporting surfaces 72a and 72b of the interior surface 60 of the first side wall structure 22 and of interior surface 62 of the second side wall structure 24 together define a middle retention location 112 (FIG. 12) for the forward shelf 50. The forward shelf supporting surfaces 74a and 74b of the interior surface 60 of the first side wall structure 22 and of interior surface 62 of the second side wall structure 24 together define an upper retention location 114 (FIG. 13) for the forward shelf 50. As is described in greater detail below, the forward shelf 50 is easily moved between the lower retention location 110 and the middle retention location 112 and easily moved between the middle retention location 112 and the upper retention location 114 due to the shape and contours of the plurality of forward shelf guiding surfaces 80a, 80b, 80c, 80d, 82a, 82b, 82c, 82d, 82e, 82f and 82g.

Figure 14:
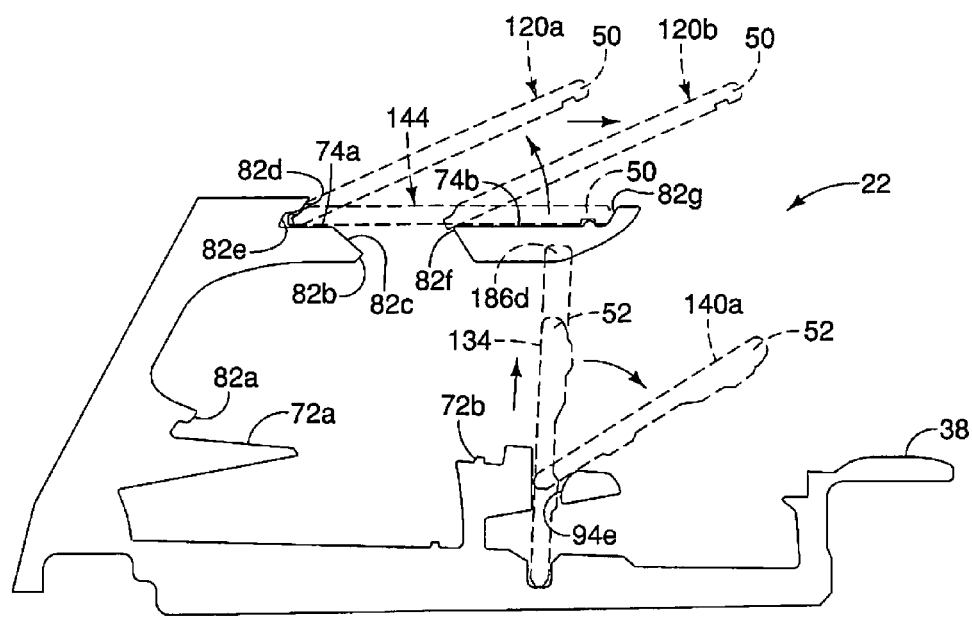
FIG. 14 is another schematic side view of the first side wall structure showing the shelf supporting surfaces and the shelf guiding surfaces with the forward shelf being moved from the upper retention location along a first movement path in a repositioning process, and the aft shelf being moved from the vertical retention location along an arcuate movement path in a repositioning process in accordance with the first embodiment.
Figure 15:
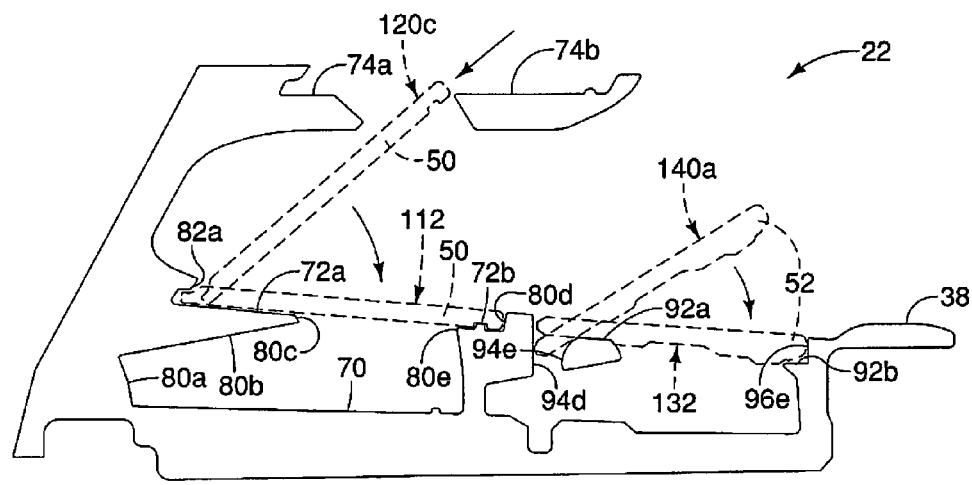
FIG. 15 is another schematic side view of the first side wall structure showing the shelf supporting surfaces and the shelf guiding surfaces with the forward shelf being moved along the first movement path to the middle retention location in the repositioning process, and the aft shelf being moved along the arcuate movement path to the upper aft retention location in the repositioning process in accordance with the first embodiment.

As shown in FIGS. 14 and 15, the plurality of forward shelf guiding surfaces 82a, 82b, 82c, 82d, 82e, 82f and 82g, define a first movement path with positions 120a-120b-120c between the middle retention location 112 and the tipper retention location 114. Specifically, when the forward shelf 50 is to be moved from the upper retention location 114 to the middle retention location 112, the forward shelf 50 is lifted to the position 120a (an inclined orientation), then pulled rearward to the position 120b (an inclined orientation), as shown in FIG. 14. The guiding surface 82d prevents forward movement of the forward shelf 50 during this repositioning operation. The forward shelf 50 then contacts the guiding surface 82f and can be slid down along the guiding surface 82f to the position 120c shown in FIG. 15. The forward shelf 50 contacts the forward shelf supporting surface 72a and can then be slid forward to contact the forward shelf guiding surface 82a, then dropped into the middle retention location 112, as shown in FIG. 15. In order to move the forward shelf 50 from the middle retention location 112 to the upper retention location 114, the reverse movements are performed with the plurality of forward shelf guiding surfaces 82a, 82b, 82c, 82d, 82e, 82f and 82g guiding and limiting movement of the forward shelf 50.

Figure 16:
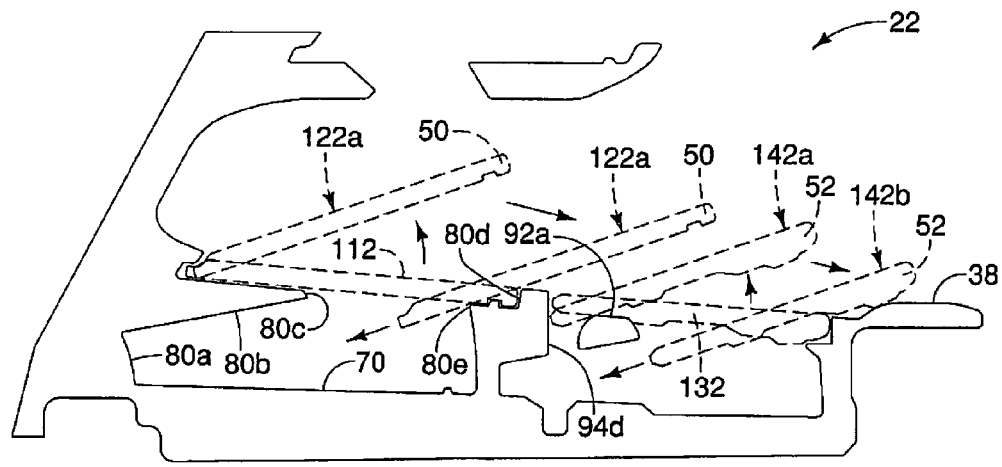
FIG. 16 is another schematic side view of the first side wall structure showing the shelf supporting surfaces and the shelf guiding surfaces with the forward shelf being moved from the middle retention location along a second movement path in another repositioning process, and the aft shelf being moved from the upper aft retention location along a rear movement path in another repositioning process in accordance with the first embodiment.
Figure 17:
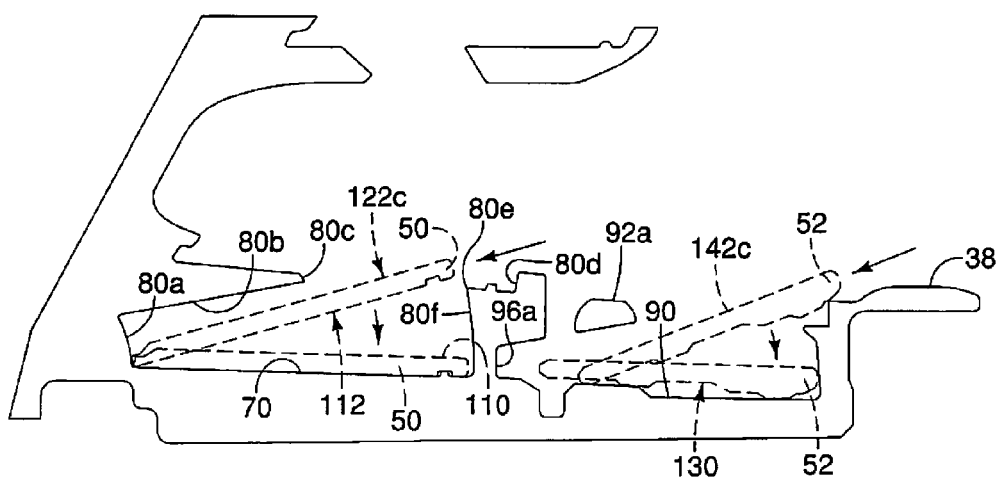
FIG. 17 is another schematic side view of the first side wall structure showing the shelf supporting surfaces and the shelf guiding surfaces with the forward shelf being moved along the second movement path to the lower retention location in the repositioning process, and the aft shelf being moved along the rear movement path to the lower aft retention location in the repositioning process in accordance with the first embodiment.

As shown in FIGS. 16 and 17, the plurality of forward shelf guiding surfaces 80a, 80b, 80c and 80d define a second movement path with positions 122a-122b-122c between the middle retention location 112 and the lower retention location 110. Specifically, as shown in FIG. 16, the forward shelf 50 is lifted from the middle retention location 112 to the position 122a (an inclined orientation), is then pulled rearward to the position 122b where the forward shelf 50 contacts the guiding surface 80e. Thereafter, as shown in FIG. 17, the forward shelf 50 is moved along the guiding surface 80e to the position 122c (an inclined orientation) when the forward shelf 50 contacts the guiding surface 80a. Thereafter, the forward shelf 50 can be dropped into the lower retention location 110 onto the forward shelf supporting surface 70. In order to move the forward shelf 50 from the lower retention location 110 to the middle retention location 112, the reverse movements are performed with the plurality of forward shelf guiding surfaces 80a, 80b, 80c, 80d, 80e and 80f guiding and limiting movement of the forward shelf 50.

Figure 12:
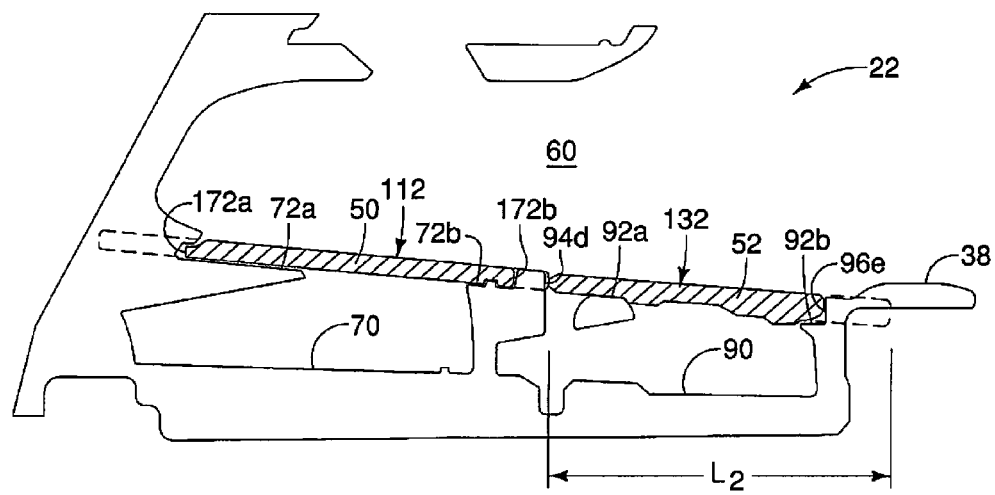
FIG. 12 is another schematic side view of the first side wall structure showing the shelf supporting surfaces and the shelf guiding surfaces with the forward shelf supported by several of the shelf supporting surfaces in a middle retention location and the aft shelf supported by several of the shelf supporting surfaces in an upper aft retention location in accordance with the first embodiment.
Figure 13:
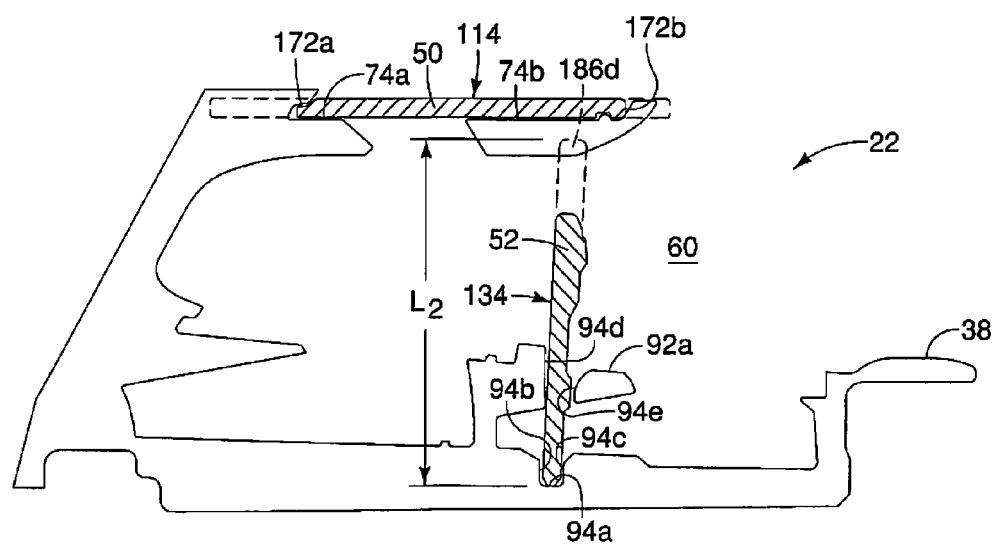
FIG. 13 is another schematic side view of the first side wall structure showing the shelf supporting surfaces and the shelf guiding surfaces with the forward shelf supported by several of the shelf supporting surfaces in an upper retention location and the aft shelf supported by several of the shelf supporting surfaces in a vertical retention location in accordance with the first embodiment.

The aft shelf supporting surface 90 of each of the interior surface 60 of the first side wall structure 22 and the interior surface 62 of the second side wall structure 24 together define a lower aft retention location 130 for the aft shelf 52, as shown in FIG. 11. The aft shelf supporting surfaces 92a and 92b define an upper aft retention location 132 for the aft shelf 52, as shown in FIG. 12. The aft shelf supporting surfaces 94a, 94b, 94c, 94d and 94e define a vertical retention location 134 for the aft shelf 52, as shown in FIG. 13.

The aft shelf supporting surface 94d is an upright vertical surface. The aft shelf guiding surface 94e has an arcuate shape that facilitates arcuate movement of the aft shelf 52. Together, the aft shelf supporting surface 94d and the aft shelf guiding surface 94e define an arcuate movement path with a position 140a between the vertical retention location 134 and the upper aft retention location 132, as shown in FIGS. 14 and 15. As shown in FIG. 14, the aft shelf 50 can be moved from the vertical retention location 134 to the upper aft retention location 132 by lifting the aft shelf 52 upward slightly from the vertical retention location 134 and allowing the aft shelf 52 to pivot along the aft shelf guiding surface 94e to the position 140a. Thereafter, the aft shelf 52 is lowered from the position 140a to the upper aft retention location 132, as shown in FIG. 15. The surfaces 94d and 96e prevent forward and rearward movement, respectively, of the aft shelf 52 once the aft shelf 52 is in the upper aft retention location 132, as shown in FIG. 15.

In order to move the aft shelf 52 from the upper aft retention location 132 to the vertical retention location 134, the reverse movements are performed.

The aft shelf guiding surfaces 96a, 96b, 96c, 96d and 96e define a rear movement path that includes positions 142a-142b-142c between the upper aft retention location 132 and the lower aft retention location 130, as shown in FIGS. 16 and 17. Specifically, in order to move the aft shelf 52 from the upper aft retention location 132 to the lower aft retention location 130, the aft shelf 52 is lifted to the position 142a (an inclined orientation), as shown in FIG. 16. Thereafter, the aft shelf 52 is pulled gently rearward to the position 142b until the aft shelf 52 drops downward off the aft shelf supporting surface 92a, as is also shown in FIG. 16. Thereafter, the aft shelf 52 is slid forward along the aft shelf supporting surface 90 passing forward through the position 142c (an inclined orientation) until the aft shelf 52 can be dropped to the lower aft retention location 130, as shown in FIG. 17. In order to move the aft shelf 52 from the lower aft retention location 130 to the upper aft retention location 132, the reverse movements are performed.

Figure 18:
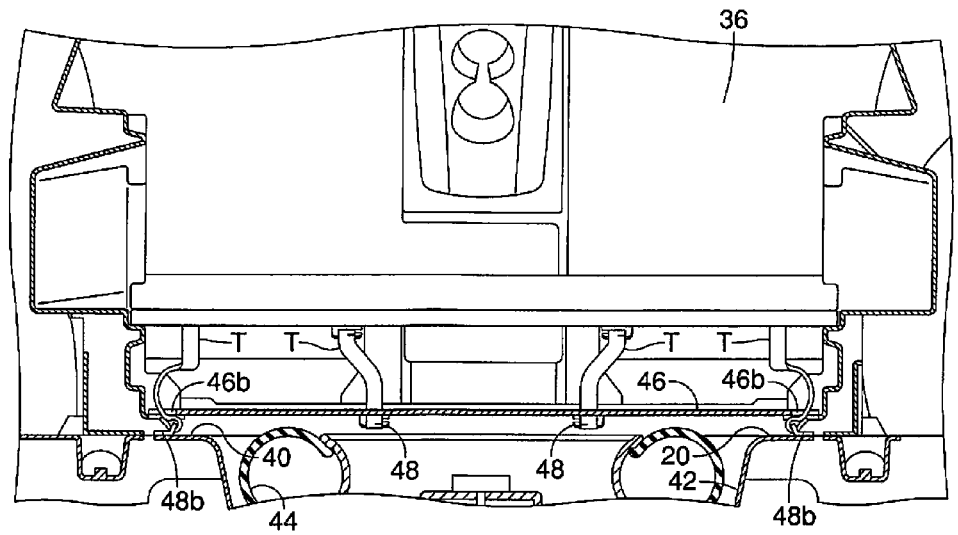
FIG. 18 is a rear cut-away view of the cargo area showing the floor structure, a concealed cargo space hidden by the deck panel, tether clips and tethers removably attached to the forward shelf in accordance with the first embodiment.

A description is now provided of the tether clips 48a and 48b, and of tethers T with specific reference to FIGS. 18-22. As shown in FIGS. 18 and 19, two tether clips 48a are located adjacent to the rear seat assembly 32 and are fixed to the floor structure 20 by, for example, mechanical fasteners such as a nut and bolt arrangement or a rivet. Two tether clips 48b are located on opposite sides of the concealed cargo space 42, and are also fixed to the floor structure 20 by, for example, mechanical fasteners such as a nut and bolt arrangement or a rivet. First ends of tethers T are releasably attached to the tether clips 48a and second ends of the tethers T are releasably attached to tether clips 48c located on the forward shelf 50, as described further below. The tethers T are dimensioned such that when the tethers T are attached to the tether clips 48a and 48c, movement of the forward shelf 50 is restricted within the cargo area 14. However, the tethers T have sufficient length such that the forward shelf 50 can move easily between the lower, middle and upper retention locations 110, 112 and 114 along the first and second movement paths. As mentioned above and shown in FIG. 6, the deck panel 46 includes recesses 46a. The tethers T extend from the tether clips 48a, through the recesses 46a and up to the tether clips 48c on the forward shelf 50.

Figure 21:
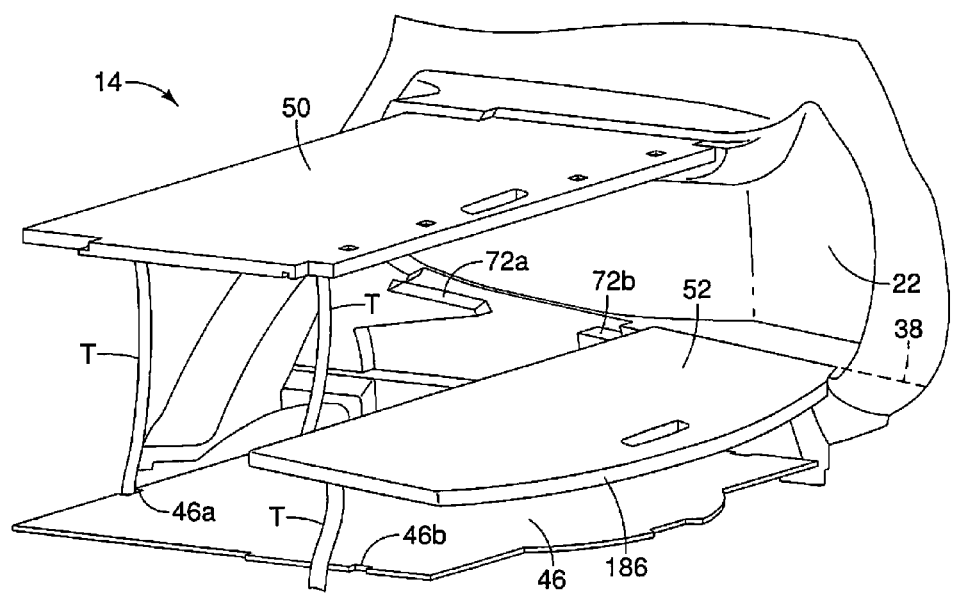
FIG. 21 is a perspective view of the cargo area showing the deck panel, the forward shelf in the upper retention location and the aft shelf in the upper aft retention location, with the tethers coupled thereto in accordance with the first embodiment.
Figure 22:
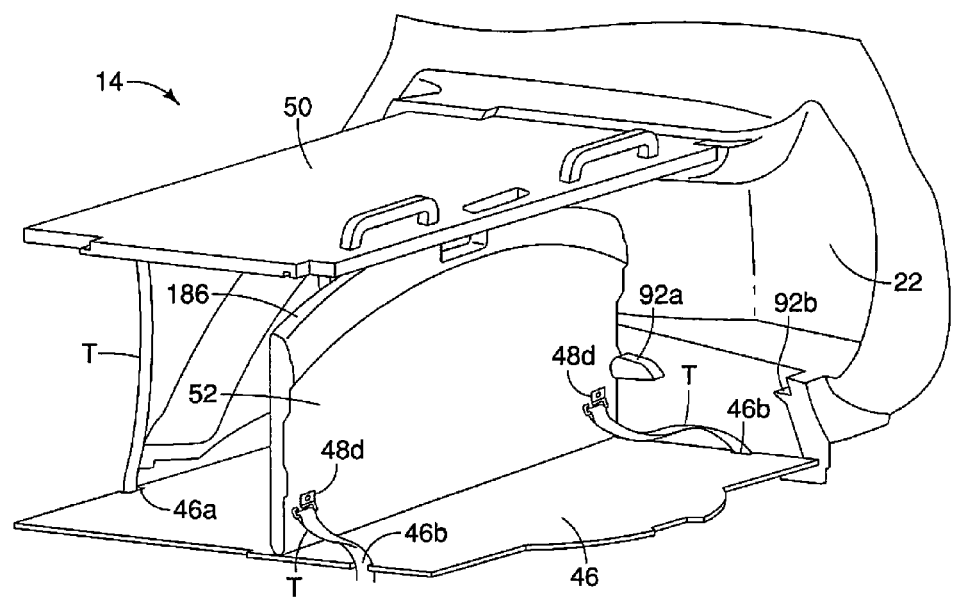
FIG. 22 is another perspective view of the cargo area similar to FIG. 21 showing the deck panel, the forward shelf in the upper retention location and the aft shelf in the vertical retention location, with the tethers coupled thereto in accordance with the first embodiment.

More specifically, as shown in FIGS. 21 and 22, the tethers T attached to the tether clips 48a and 48c restrict movement of the forward shelf 50 such that the forward shelf 50 can be easily moved along the first and second movement paths between the lower retention location 110, the middle retention location 112 and the upper retention location 114. However, the forward shelf 50 cannot be removed from the cargo area 14 when the tethers T are coupled to the tether clips 48a and 48c. Only after the tethers T are unhooked from the tether clips 48a and 48c, can the forward shelf 50 be removed from the cargo area 14 and the vehicle 10, if desired.

Similarly, first ends of the rearward tethers T are releasably attached to the tether clips 48b and second ends of the tethers T are releasably attached to tether clips 48d located on the aft shelf 52. The tethers T are dimensioned such that when the tethers T are attached to the tethers 48b and 48d, movement of the aft shelf 52 is restricted within the cargo area 14. However, the tethers T have sufficient length such that the aft shelf 52 can move easily between the lower and upper aft retention locations 130 and 132 and can move freely to the vertical retention location 134. As mentioned above and shown in FIG. 6, the deck panel 46 includes recesses 46b. The tethers T extend from the tether clips 46b, through the recesses 46b and up to the tether clips 48d on the aft shelf 52.

More specifically, as shown in FIGS. 21 and 22, the tethers T attached to the tether clips 48b and 48d restrict movement of the aft shelf 52 such that the aft shelf 52 can be easily moved along the rear movement path and the arcuate movement path between the lower aft retention location 130, the upper aft retention location 132 and the vertical retention location 134. However, the aft shelf 52 cannot be removed from the cargo area 14 when the tethers T are coupled to the tether clips 48b and 48d. Only after the tethers T are unhooked from the tether clips 48b and 48d, can the aft shelf 52 be removed from the cargo area 14 and the vehicle 10, if desired.

A description of the forward shelf 50 is now provided with specific reference to FIGS. 23-30. The forward shelf 50 is preferably made of a rigid foam material coated or covered by a further rigid material such as a plastic, resin and/or polymer material. The forward shelf 50 has an upper surface 160, a lower surface 162 and a handle portion 164. The handle portion 164 is basically an opening that extends from the upper surface 160 to the lower surface 162. The handle portion 164 extends in a vehicle lateral direction (side to side) for ease of gripping by the hand of a vehicle operator, allowing free movement of the forward shelf 50 between the lower, middle and upper retention locations 110, 112 and 114.

Figure 23:
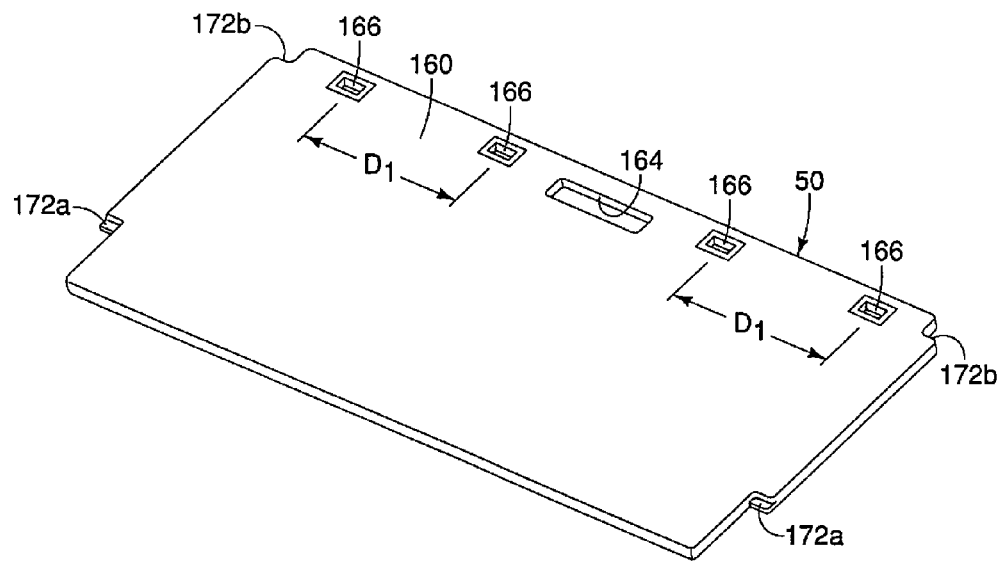
FIG. 23 is a perspective view of the forward shelf shown removed from the vehicle showing an upper surface that includes fastening structures that receive removable bar members in accordance with the first embodiment.

The upper surface 160 of the forward shelf 50 also includes first fastening structures defined by apertures 166. There are two pairs of apertures 166, each pair of apertures 166 defining one of the first fastening structures, as described below. As shown in FIG. 23, the apertures 166 in each pair of apertures 166 are spaced apart from one another by a distance $D_1$.

Figure 24:
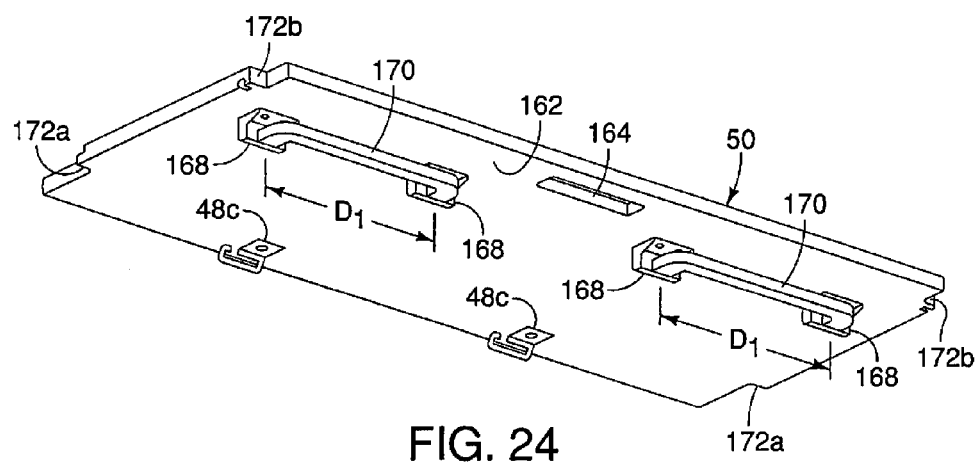
FIG. 24 is a perspective view of the forward shelf shown removed from the vehicle showing a lower surface that also includes fastening structures that receive removable bar members, with the removable bar members in a stowed orientation along the lower surface of the forward shelf in accordance with the first embodiment.
Figure 30:
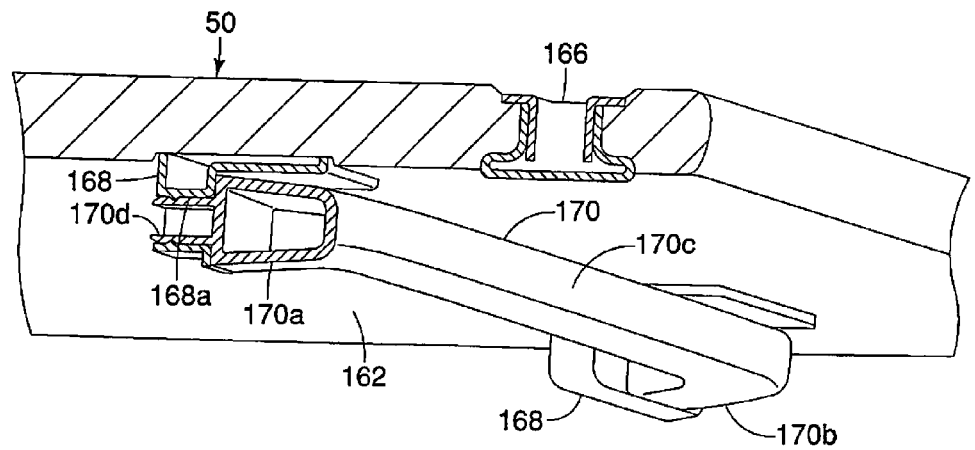
FIG. 30 is a cross-sectional perspective view of the forward shelf showing the lower surface and the fastening structures with one of the removable bar members attached to the fastening structures on the lower surface in accordance with the first embodiment.

The lower surface 162 of the forward shelf 50 includes second fastening structures defined by projections 168 and further includes two of the tether retaining clips 48c, as shown in FIGS. 24-26 and 28. As shown in FIG. 30, each of the projections 168 includes an aperture 168a. There are two pairs of the projections 168, each pair of projections 168 defining a second fastening structure. As shown in FIG. 24, the apertures 168a in each pair of apertures 168a are spaced apart from one another by the distance $D_1$, corresponding to the distance between the apertures 166.

Figure 26:
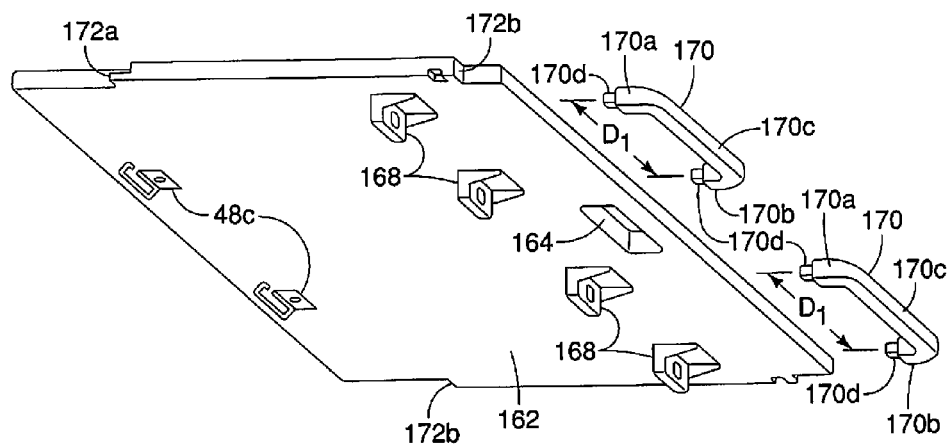
FIG. 26 is an exploded perspective view of the forward shelf showing the lower surface and the fastening structures with the removable bar members detached from the fastening structure in accordance with the first embodiment.

The forward shelf 50 also includes at least one removable member 170 (a bar member). In the depicted embodiment, there are two of the removable members 170. Each removable member 170 includes a first end 170a, a second end 170b and a bar section 170c that extends between the first end 170a and the second end 170b. Each of the first end 170a and the second end 170b includes a snap-fitting projection 170d. Hence, each removable member 170 includes two snap-fitting projections 170d. As shown in FIG. 26, the snap-fitting projections 170d are spaced apart from one another by the distance $D_1$, corresponding to the distance between the apertures 166 and the apertures 168a.

Figure 25:
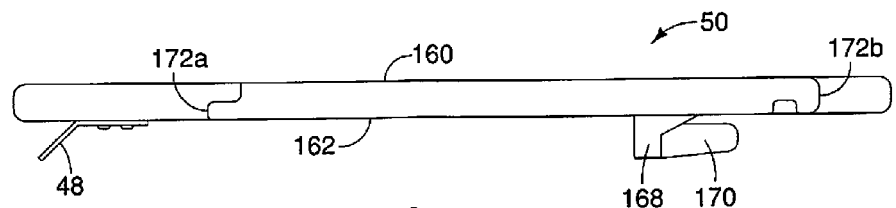
FIG. 25 is a side view of the forward shelf showing the removable bar members in a stowed orientation along the lower surface in accordance with the first embodiment.
Figure 28:
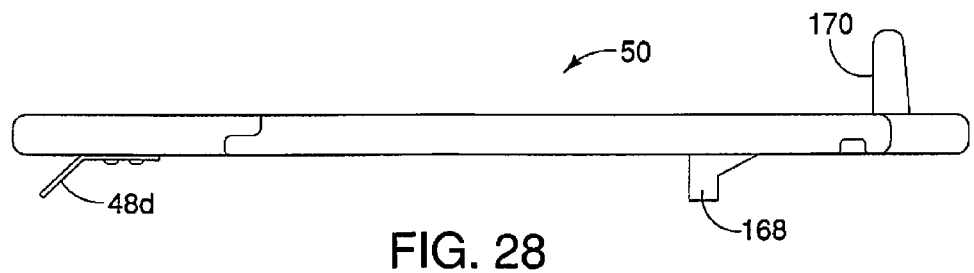
FIG. 28 is another side view of the forward shelf similar to FIG. 25 showing the removable bar members in the cargo movement restricting orientation along the upper surface in accordance with the first embodiment.
Figure 29:
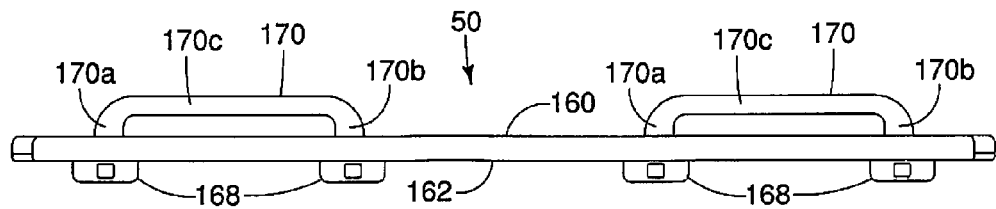
FIG. 29 is a rear view of the forward shelf showing the removable bar members in the cargo movement restricting orientation along the upper surface in accordance with the first embodiment.

The apertures 166 in the upper surface 160 and the apertures 168a in the projections 168 of the lower surface 162 are dimensioned to removably receive and retain the snap-fitting projection 170d of each removable member 170. The snap-fitting projections 170d basically define releasable fastener structures dimensioned such that the removable member 170 can be freely moved between two locations: a cargo movement restricting orientation corresponding to attachment to the apertures 166 in the upper surface 160 as shown in FIGS. 27, 28 and 29; and a stowed orientation corresponding to attachment to the apertures 168a in the projections 168 along the lower surface 162, as shown in FIGS. 24, 25 and 30.

More specifically, when the removable member 170 is installed in the cargo movement restricting orientation (FIGS. 27-29), the removable member 170 extends along the upper surface 160 of the forward shelf 50 and can limit the movement of cargo placed on the upper surface 160 of the forward shelf 50. In the cargo movement restricting orientation, the bar section 170c is spaced apart from the upper surface 160 and is parallel to the upper surface 160.

When the removable members 170 are each in the stowed orientation adjacent to the lower surface 162 of the forward shelf 50, the removable members 170 are partially hidden from view and are not obtrusive. With the forward shelf 50 in either of the middle retention location 112 or the upper retention location 114, the removable members 170 are easily accessed when in the stowed orientation, such that they can be pulled out of the apertures 168a and moved to the cargo movement restricting orientation.

Figure 27:
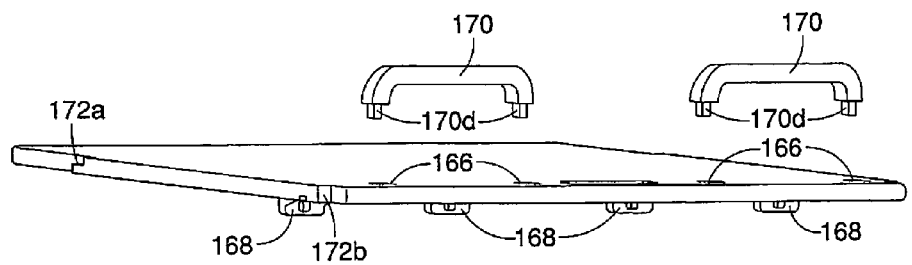
FIG. 27 is another exploded perspective view of the forward shelf showing the upper surface and the fastening structures with the removable bar members detached from the fastening structures positioned for attachment in a cargo movement restricting orientation in accordance with the first embodiment.

With the forward shelf 50 in any one of the lower retention location 110, the middle retention location 112 or the upper retention location 114, and the removable members 170 being in the cargo movement restricting orientation the snap-fitting projections 170d extend in a vertical direction, as shown in FIG. 27. Further, with the removable members 170 being in the stowed orientation the snap-fitting projections 170d extend in a horizontal direction, as shown in FIG. 30. In other words, any one of the side surfaces of the removable member 170 can be considered a main surface of the removable member. That main surface of the removable member 170 extends in a first direction with the removable member 170 in the cargo movement restricting orientation and that main surface of the removable member 170 extends in a second direction perpendicular to the first direction with the removable member 170 in the stowed orientation.

The first end 170a, the second end 170b, the bar section 170c and the snap-fitting projections 170d are all formed unitarily as a single, monolithic element. Further, the first end 170a, the second end 170b, the bar section 170d and the snap-fitting projections 170d of the removable member 170 are angularly offset from one another such that they define a C-shape when viewed along a side surface thereof.

The removable members 170 have the appearance of being removable handles. However, the removable members 170 are not specifically designed to be handles. Rather, the removable members 170 are specifically intended to be used to limit the movement of cargo placed upon the upper surface 160 of the forward shelf 50.

Further, with the seatback 36 of the rear seat assembly 32 in the upright orientation, and with the removable members 170 in the cargo movement restricting orientation, the forward shelf 50, the removable members 170, the seatback 36 and portions of the first and second side wall structures 22 and 24 define a storage space within the cargo area 14 that restricts horizontal movement of cargo placed on the forward shelf 50.

The forward shelf 50 has a generally rectangular shape, as shown in FIGS. 23 and 24. However, each of the four corners of the forward shelf 50 includes a notch or recess. Specifically, the forward corners include recesses 172a and the rearward corners include recesses 172b. It should be understood from, for example, FIGS. 11, 12 and 13, that the cross sectional depiction of the forward shelf 50 is taken at the recesses 172a and 172b. In other words, the forward shelf 50 has an overall length that is greater than that depicted in FIGS. 11, 12 and 13. The actual overall length $L_1$ of the forward shelf 50 is shown in FIG. 11, with those sections cut off by the recesses 172a and 172b being shown with phantom lines.

Figure 31:
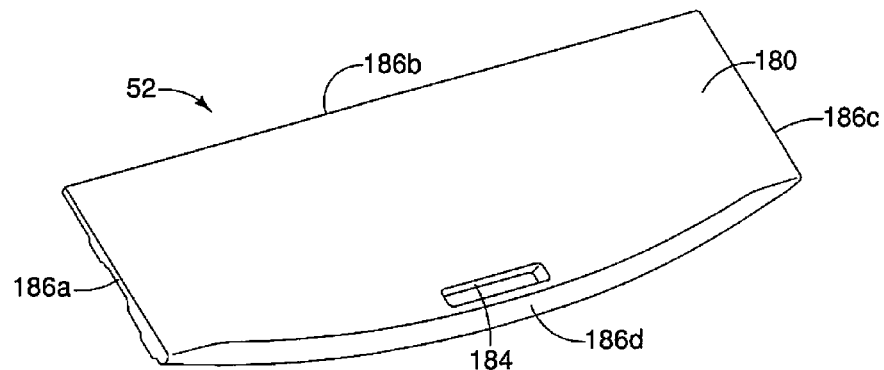
FIG. 31 is a perspective view of the aft shelf showing the upper surface in accordance with the first embodiment.
Figure 32:
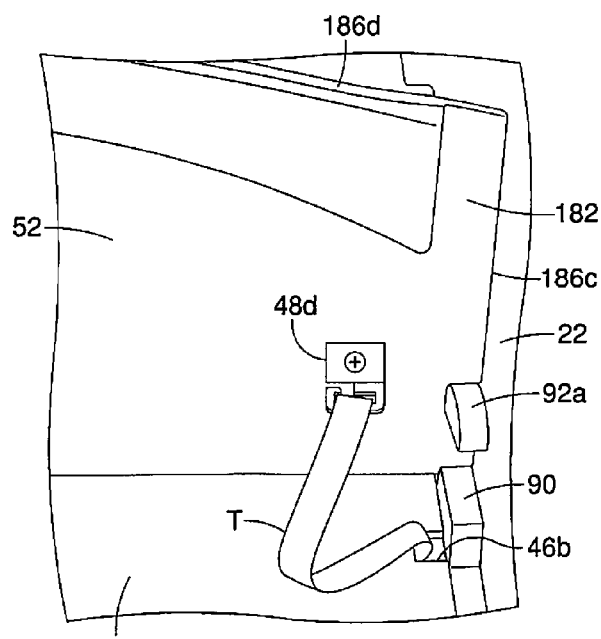
FIG. 32 is a perspective view of the cargo area showing the deck panel and the aft shelf with the aft shelf in the vertical retention location and further showing one of the tethers connected to the aft shelf in accordance with the first embodiment.
Figure 33:
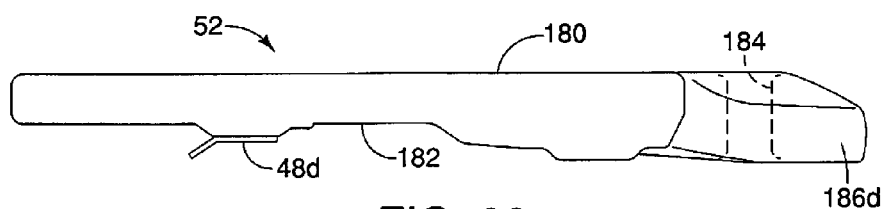
FIG. 33 is a side view of the aft shelf showing the tether clips attached to a lower surface thereof in accordance with the first embodiment.

A description of the aft shelf 52 is now provided with specific reference to FIGS. 31, 32 and 33. The aft shelf 52 has an upper surface 180 and a lower surface 182. Reference to the upper surface 180 and the lower surface 182 is relative to the aft shelf 52 being in either of the lower aft retention location 130 (FIG. 11) and the upper aft retention location 132 (FIG. 12). The aft shelf 52 further includes a handle portion 184 and a peripheral edge including edge portions 186a, 186b, 186c and 186d. The handle portion 184 is defined by an aperture that extends from the upper surface 180 to the lower surface 182. The handle portion 184 is formed adjacent to the edge 186d of the aft shelf 52.

The handle portion 184 extends in a vehicle lateral direction, side to side, for ease of gripping by the hand of a vehicle operator, allowing free movement of the forward shelf 50 between the lower aft retention location 130, the upper aft retention location 132 and the vertical retention location 134.

The aft shelf 52 has an overall rectangular shape as defined by the edge portions 186a, 186b and 186c. However, the edge portion 186d has an arcuate or curved contour, as shown in FIGS. 21, 22 and 31. It should be understood that the depiction in FIGS. 11-13 shows the aft shelf 52 in a cross-section taken adjacent to the edge portion 186c. Hence, due to the curvature of the edge portion 186d, the cross-section of the aft shelf 52 in FIGS. 11-13 gives the appearance of the aft shelf 52 being smaller. Therefore, in FIGS. 11, 12 and 13, the actual overall length $L_2$ of the aft shelf 52 is shown with the edge portion 186d being depicted in phantom.

Figure 7:
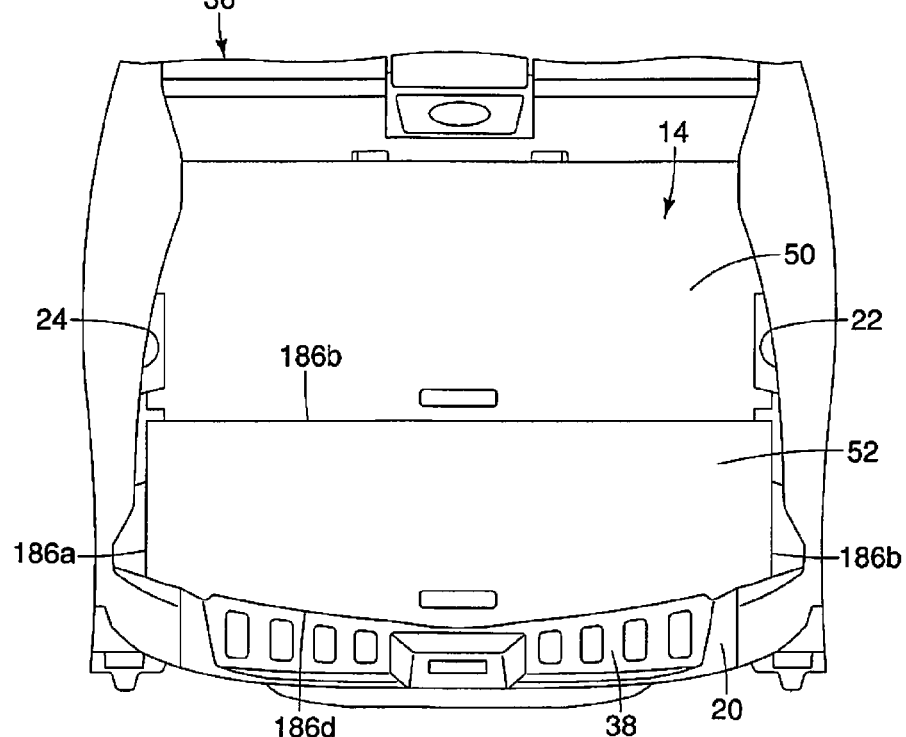
FIG. 7 yet another a rear perspective view showing the cargo area with the forward shelf and the aft shelf installed covering the deck panel in accordance with the first embodiment.

The curvature of the edge portion 186d mates with the curvature of the sill section 38 of the rear hatch opening 28, as shown in FIGS. 2 and 7. Thus, when the forward shelf 50 is in the middle retention location 112 and the aft shelf 52 is in the upper aft retention location 132, the upper surfaces of the forward shelf 50 and the aft shelf 52 are parallel to one another and approximately parallel to the surface of the sill section 38, as shown in FIGS. 2 and 5.

The lower surface 182 of the aft shelf 52 includes two of the tether clips 48d, as shown in FIGS. 32 and 33.

The shelving arrangement 16 is further explained with the following description of the various combinations of positions and orientations of the forward shelf 50, the aft shelf 52 and the seatback 36, with specific reference to FIGS. 34 thru 53.

In FIGS. 34 thru 43, the seatback 36 is in the upright orientation or seating orientation thereby defining a forward boundary for the cargo area 14. In FIGS. 44 thru 53, the seatback 36 is in the folded orientation, thus extending or enlarging the cargo area 14. In each of the depicted orientations, the forward shelf 50 and the aft shelf 52 extend from the first side wall structure 22 to the second side wall structure 24, and are resting on the shelf supporting surfaces of the first side wall structure 22 and the second side wall structure 24, as described above.

In FIGS. 8, 9, 11, 34 and 44, the forward shelf 50 is in the lower retention location 110 and the aft shelf 52 is in the lower aft retention location 130. In these retention locations, the forward shelf 50 and the aft shelf 52 are co-planar. This configuration of the shelving arrangement 16 maximizes the cargo capacity of the cargo area 14.

Figure 35:
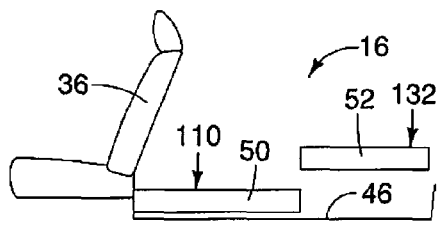
Figure 45:
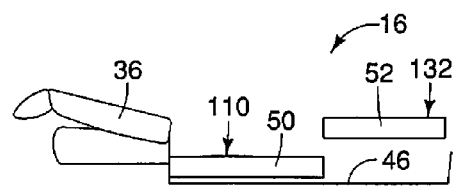

In FIGS. 35 and 45, the forward shelf 50 is in the lower retention location 110 and the aft shelf 52 is in the upper aft retention location 132. In this configuration, the forward shelf 50 and the aft shelf 52 are not co-planar. Rather, the aft shelf 52 is slightly higher than the forward shelf 50. Any cargo placed on the upper surface of the forward shelf 50 will have limited movement due to the seatback 36 and the aft shelf 52 being above the level of the forward shelf 50.

Figure 36:
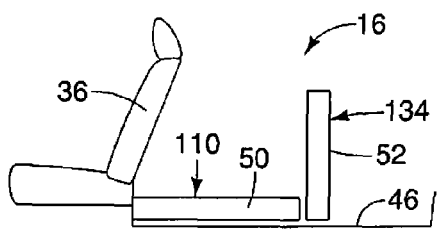
Figure 46:
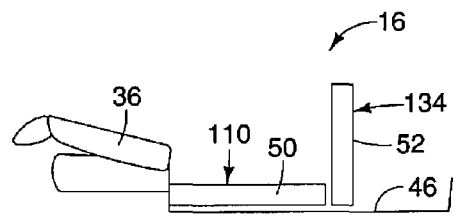

In FIGS. 36 and 46, the forward shelf 50 is in the lower retention location 110 and the aft shelf 52 is in the vertical retention location 134. In this configuration, the forward shelf 50 and the aft shelf 52 are perpendicular to one another.

Figure 37:
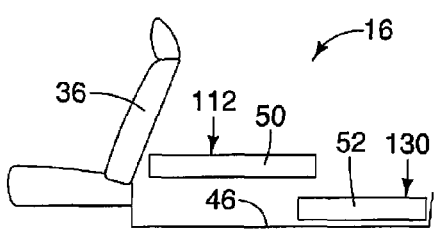
Figure 47:
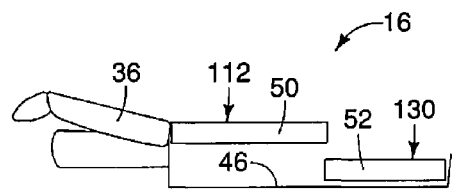

In FIGS. 37 and 47, the forward shelf 50 is in the middle retention location 112 and the aft shelf 52 is in the lower aft retention location 130. In this configuration, the forward shelf 50 and the aft shelf 52 are parallel to one another, but vertically offset from one another. Specifically, the forward shelf 50 is higher than the aft shelf 52.

Figure 38:
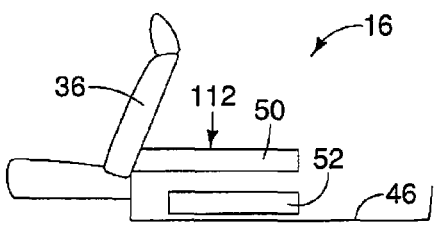
Figure 48:
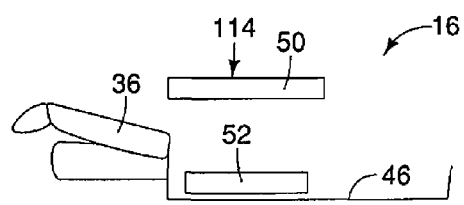

In FIG. 38, the forward shelf 50 is in the middle retention location 112 and the aft shelf 52 is stowed underneath the forward shelf 50. In FIG. 48, the forward shelf 50 is in the upper retention location 114 and the aft shelf 52 is again stowed underneath the forward shelf 50.

Figure 39:
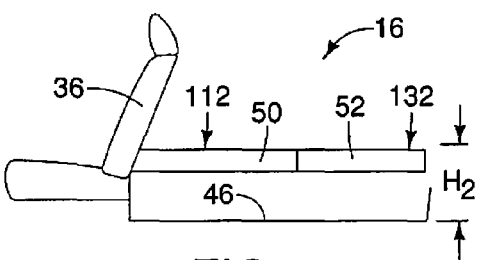
Figure 49:
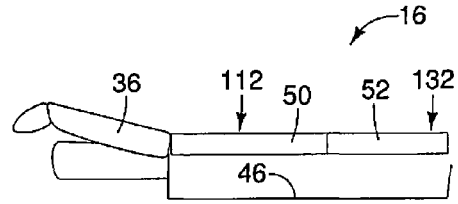

In FIGS. 39 and 49, the forward shelf 50 is in the middle retention location 112 and the aft shelf 52 is in the upper aft retention location 132. In this configuration, the forward shelf 50 and the aft shelf 52 are co-planar. Further, in FIG. 49, the seatback 36, the forward shelf 50 and the aft shelf 52 are approximately aligned (approximately co-planar) such that a back-side surface of the seatback 36 and the upper surfaces of the forward shelf 50 and the aft shelf 52 define an extended approximately planar cargo receiving surface.

Figure 40:
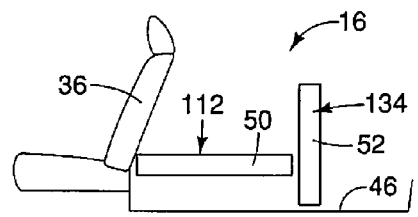
Figure 50:
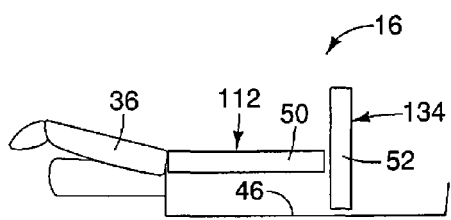

In FIGS. 40 and 50, the forward shelf 50 is in the middle retention location 112 and the aft shelf 52 is in the vertical retention location 134. In this configuration, the forward shelf 50 and the aft shelf 52 are perpendicular to one another. Further, the aft shelf 52 serves to box in and enclose an area beneath the forward shelf 50. Hence, the area under the forward shelf 50 is a hidden or concealed storage space.

Figure 41:
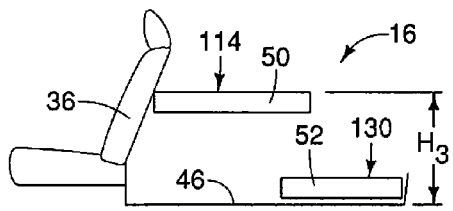
Figure 51:
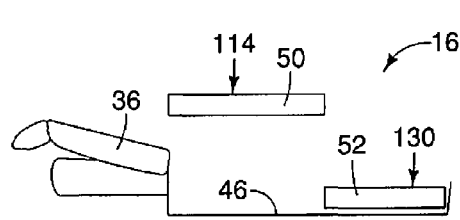

In FIGS. 41 and 51, the forward shelf 50 is in the upper retention location 114 and the aft shelf 52 is in the lower aft retention location 130. In this configuration, the forward shelf 50 and the aft shelf 52 are parallel to one another, but vertically offset from one another with the forward shelf 50 being higher than the aft shelf 52.

Figure 42:
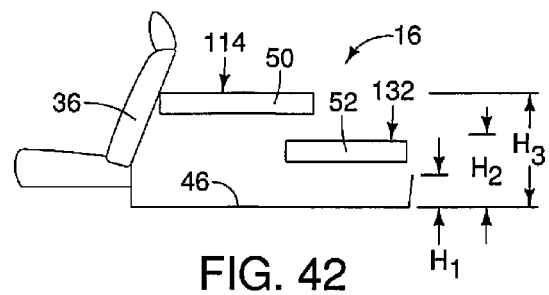
Figure 52:
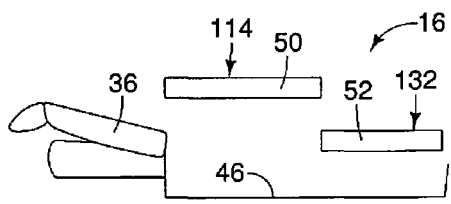

In FIGS. 42 and 52, the forward shelf 50 is in the upper retention location 114 and the aft shelf 52 is in the upper aft retention location 132. In this configuration, the forward shelf 50 and the aft shelf 52 are again parallel to one another, but vertically offset from one another with the forward shelf 50 being higher than the aft shelf 52.

Figure 43:
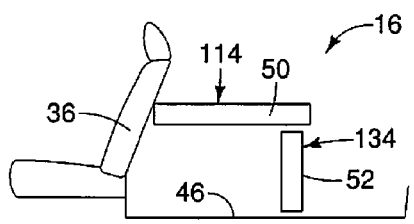
Figure 53:
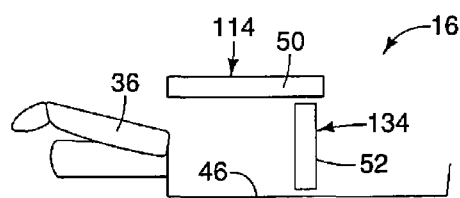

In FIGS. 43 and 53, the forward shelf 50 is in the upper retention location 114 and the aft shelf 52 is in the vertical retention location 134. In this configuration, the forward shelf 50 and the aft shelf 52 are perpendicular to one another. Further, the aft shelf 52 serves to box in and enclose an area beneath the forward shelf 50. Hence, the area under the forward shelf 50 is a completely hidden or completely concealed storage space that is larger than the concealed storage space defined in FIGS. 40 and 50. It should further be understood from FIG. 43, that the back or rearward surface of the seatback 36, the forward shelf 50 and the aft shelf 52 define a completely enclosed storage space between the first and second side surface structures 22 and 24.

Figure 34:
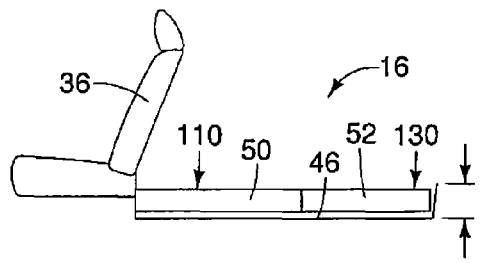
FIGS. 34-43 are schematic side views of the cargo area with the seatback of the rear seat in the upright orientation, with the forward and aft shelves in various combinations of positions in accordance with the first embodiment.

As is shown in FIGS. 34 and 42, when the forward shelf 50 is in the lower retention location 110 and the aft shelf 52 is in the lower aft retention location 130, the respective upper surfaces of the forward shelf 50 and the aft shelf 52 are located a distance $H_1$ above the deck panel 46 (and the upper surface of the floor structure 20). As shown in FIGS. 39 and 42, when the forward shelf 50 is in the middle retention location 112 and the aft shelf 52 is in the upper aft retention location 132, the respective upper surfaces of the forward shelf 50 and the aft shelf 52 are located a distance $H_2$ above the deck panel 46. As shown in FIGS. 41 and 42, when the forward shelf 50 is in the upper retention location 114, the upper surface of the forward shelf 50 is located a distance $H_3$ above the deck panel 46. As is shown in FIG. 42, the distance $H_3$ is greater than the distance $H_2$. Further, the distance $H_2$ is greater than the distance $H_1$.

As shown in FIGS. 22, 43 and 53, with the forward shelf 50 in the upper retention location 114 and the aft shelf 52 in the vertical retention location 134, the aft shelf 52 is entirely beneath the forward shelf 50. Hence, the edge portion 186d extends up to a point just below the lower surface 162 of the forward shelf 50. In other words, as shown in FIG. 22, an uppermost portion (the edge portion 186d) of the aft shelf 52 extends below the forward shelf 50.

Figure 54:
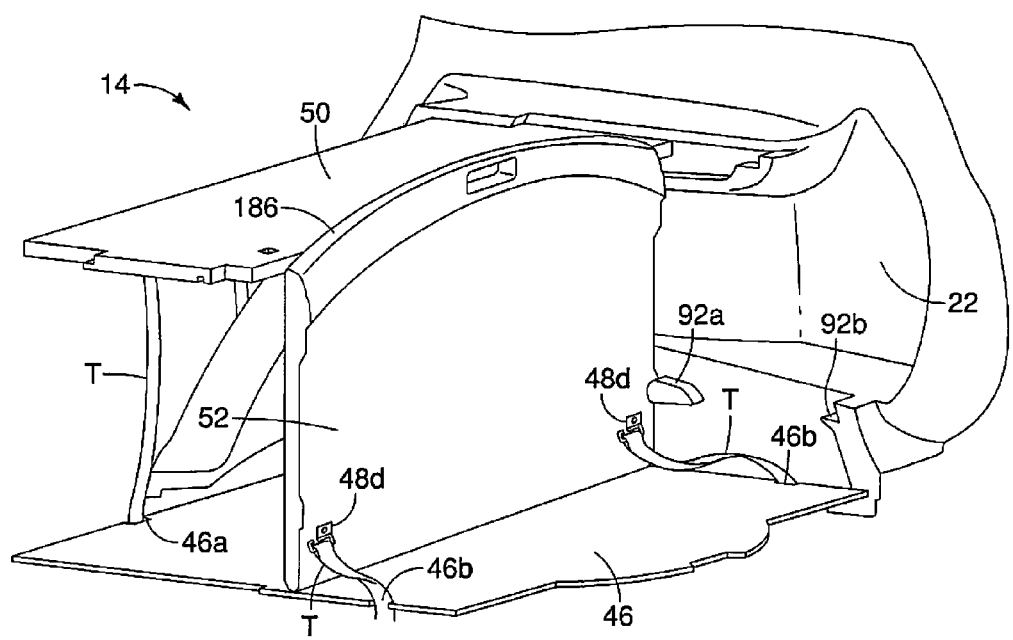
FIG. 54 is a perspective view of the cargo area similar to FIG. 22 showing the deck panel, the forward shelf in the upper retention location and the aft shelf in the vertical retention location, with the tethers coupled thereto, where the shelf supporting surfaces and the shelf guiding surfaces have been modified such that an uppermost edge of the aft shelf extends above the forward shelf in accordance with a modification of the first embodiment.
Figure 55:
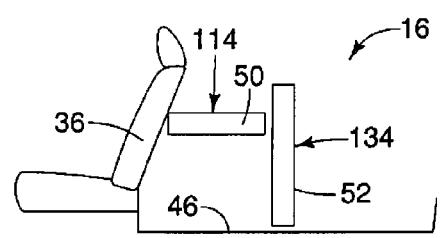
FIG. 55 is a schematic side view of the cargo area similar to FIG. 43 showing the seatback of the rear seat in the upright orientation, the forward shelf in the upper retention location and the aft shelf in the vertical retention location in accordance with the modification of the first embodiment.
Figure 56:
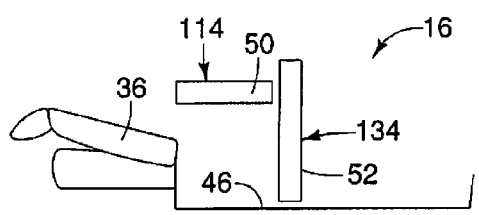
FIG. 56 is a schematic side view of the cargo area similar to FIG. 53, with the seatback of the rear seat in the folded orientation, the forward shelf in the upper retention location and the aft shelf in the vertical retention location in accordance with the modification of the first embodiment.

It should be understood from the drawings and the description herein that the shelf supporting surfaces of the first and second side wall structures 22 and 24 can be modified and re-positioned such that any of a variety of relative retention locations of the forward shelf 50 and the aft shelf 52 can be achieved. For example, as shown in FIGS. 54, 55 and 56 depicting a modification of the first embodiment, with the forward shelf 50 in the upper retention location 114 and the aft shelf 52 in the vertical retention location 134, an uppermost portion (the edge portion 186d) of the aft shelf 52 extends above the forward shelf 50. The modification to the first embodiment shown in FIGS. 54-56 only show the forward shelf 50 in the tipper retention location 114 and the aft shelf 52. The schematic representations in FIGS. 34-42 and 44-52 of the positioning of the forward shelf 50 and the aft shelf 52 also apply to the modification to the first embodiment.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure, comprising
a vehicle floor;
a first side wall structure extending upward from a first side of the vehicle floor and having a first shelf supporting surface;
a second side wall structure extending upward from a second side of the vehicle floor opposite the first side wall structure and having a second shelf supporting surface, the vehicle floor, the first side wall structure and the second side wall structure at least partially defining a vehicle cargo area, the first and second shelf supporting surfaces being aligned with one another defining a shelf retention location within the vehicle cargo area; and
a shelf removably positioned in the shelf retention location extending from the first side wall structure to the second side wall structure, the shelf including an upper surface having a first fastening structure and a lower surface having a second fastening structure; and
a removable member having a bar section and a fastener structure fixedly attached to the bar section, the fastener structure being removably attachable to the first fastening structure and the second fastening structure such that with the fastener structure of the removable member attached to the first fastening structure the bar section is positioned in a cargo movement restricting orientation along the upper surface of the shelf and with the fastener structure attached to the second fastening structure the removable member is in a stowed orientation adjacent to the lower surface of the shelf.

2. The vehicle body structure according to claim 1, wherein
the first fastening structure includes at least a first aperture formed in the upper surface of the shelf, and
the fastener structure of the removable member includes at least one first snap fitting projection fixedly attached to the bar section, the at least one snap fitting projection being configured to removably attach to the shelf upon insertion into the first aperture.

3. The vehicle body structure according to claim 2, wherein
the first fastening structure includes a second aperture formed in the upper surface of the shelf spaced apart from the first aperture by a first distance, and
the fastener structure of the removable member includes a second snap fitting projection with the at least one snap fitting projection being fixedly attached to a first end of the bar section and the second snap fitting projection being fixedly attached to a second end of the bar section, the first and second snap fitting projections being spaced apart from one another by the first distance and being configured to removably attach to the shelf upon insertion into the first and second apertures.

4. The vehicle body structure according to claim 3, wherein the bar section, the first snap fitting projection and the second snap fitting projection are all formed unitarily as a single, monolithic element.

5. The vehicle body structure according to claim 3, wherein the second fastening structure includes a first protrusion and a second protrusion that extend from the lower surface of the shelf, each of the first and second protrusions having an aperture formed therein spaced apart from one another by the first distance such that the first and second snap fitting projections are configured to removably attach to the first and second protrusions upon insertion into the apertures of the first and second protrusions.

6. The vehicle body structure according to claim 1, wherein the second fastening structure includes at least one protrusion that extends from the lower surface of the shelf, the at least one protrusion has an aperture formed therein, and
the fastener structure of the removable member includes at least one snap fitting projection attached to a first end of the bar section, the at least one snap fitting projection being configured to removably attach to the shelf upon insertion into the apertures of the at least one protrusions.

7. The vehicle body structure according to claim 6, wherein the bar section and the at least one snap fitting projection are formed unitarily as a single, monolithic unitary element.

8. The vehicle body structure according to claim 1, wherein the first side wall structure includes a third shelf supporting surface and the second side wall structure includes a fourth shelf supporting surface, the third and fourth shelf supporting surfaces being aligned with one another defining a second shelf retention location within the vehicle cargo area, and
the shelf is movable from the first shelf retention location to the second shelf retention location.

9. The vehicle body structure according to claim 1, further comprising
a rear seat having a seat back movable between an upright orientation and a folded orientation such that with the rear seat in the upright orientation, the shelf in the shelf retention location and the removable member in the cargo movement restricting orientation, the shelf, the removable member, the seat back and portions of the first and second side wall structures define a storage space within the vehicle cargo area that restricts horizontal movement of cargo placed on the shelf.

10. The vehicle body structure according to claim 1, further comprising
a rear seat having a seat back movable between an upright orientation and a folded orientation such that with the rear seat in the folded orientation and the shelf in the shelf retention location the first shelf and a back-side surface of the seat back define an approximately planar cargo receiving surface.

11. The vehicle body structure according to claim 1, wherein
a main surface of the removable member extends in a first direction with the removable member in the cargo movement restricting orientation and the main surface of the removable member extends in a second direction perpendicular to the first direction with the removable member in the stowed orientation.

12. The vehicle body structure according to claim 1, wherein
the bar section and the fastener structure of the removable member are angularly offset from one another defining a C-shape when viewed along a main surface thereof.

13. The vehicle body structure according to claim 1, wherein
the bar section of the removable member extends in a direction parallel to the upper surface of the shelf and the fastener structure extends from the bar section to the upper surface of the shelf with the removable member in the cargo movement restricting orientation.

14. The vehicle body structure according to claim 1, wherein
the first fastening structure of the shelf is flush with the upper surface of the shelf with the removable member in the stowed orientation.

15. A vehicle body structure, comprising
a shelf panel removably positionable in a vehicle shelf retention location and including an upper surface having a first fastening structure and a lower surface having a second fastening structure; and
a removable member having a bar section and a fastener structure fixedly attached to the bar section, the fastener structure being removably attachable to the first fastening structure and the second fastening structure such that with the fastener structure of the removable member attached to the first fastening structure the bar section is positioned in a cargo movement restricting orientation along the upper surface of the shelf and with the fastener structure attached to the second fastening structure the removable member is in a stowed orientation adjacent to the lower surface of the shelf.

16. The vehicle body structure according to claim 15, wherein
a main surface of the removable member extends in a first direction with the removable member in the cargo movement restricting orientation and the main surface of the removable member extends in a second direction perpendicular to the first direction with the removable member in the stowed orientation.

17. The vehicle body structure according to claim 15, wherein
the bar section and the fastener structure of the removable member are angularly offset from one another defining a C-shape when viewed along a main surface thereof.

18. The vehicle body structure according to claim 15, wherein
the first fastening structure includes at least a first aperture formed in the upper surface of the shelf, and
the fastener structure of the removable member includes at least a first snap fitting projection fixedly attached to the bar section, the at least one snap fitting projection being configured to removably attach to the shelf upon insertion into the first aperture.

19. The vehicle body structure according to claim 18, wherein
the first fastening structure includes a second aperture formed in the upper surface of the shelf spaced apart from the first aperture by a first distance, and
the fastener structure of the removable member includes a second snap fitting projection with the at least one snap fitting projection being fixedly attached to a first end of the bar section and the second snap fitting projection being fixedly attached to a second end of the bar section, the at least one snap fitting projection and second snap fitting projection being spaced apart from one another by the first distance and being configured to removably attach to shelf upon insertion into the first and second apertures.

20. The vehicle body structure according to claim 19, wherein
the bar section, the at least one snap fitting projection and the second snap fitting projection are all formed unitarily as a single, monolithic element.

* * * * *